US012732621B2

(12) United States Patent
Jun et al.

(10) Patent No.: US 12,732,621 B2
(45) **Date of Patent: *Sep. 8, 2026**

(54) IMAGE ENCODING/DECODING METHOD AND APPARATUS, AND RECORDING MEDIUM FOR STORING BITSTREAM

(71) Applicant: LX Semicon Co., Ltd., Daejeon (KR)

(72) Inventors: Dong San Jun, Daejeon (KR); Jung Won Kang, Daejeon (KR); Hyun Suk Ko, Daejeon (KR); Sung Chang Lim, Daejeon (KR); Jin Ho Lee, Daejeon (KR); Ha Hyun Lee, Seoul (KR); Hui Yong Kim, Daejeon (KR)

(73) Assignee: LX Semicon Co., Ltd., Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 19/024,967

(22) Filed: Jan. 16, 2025

(65) Prior Publication Data

US 2025/0159193 A1 May 15, 2025

Related U.S. Application Data

(63) Continuation of application No. 18/626,903, filed on Apr. 4, 2024, now Pat. No. 12,519,949, which is a (Continued)

(30) Foreign Application Priority Data

Sep. 29, 2017 (KR) ........................ 10-2017-0128130

(51) Int. Cl.
*H04N 19/147* (2014.01)
*H04N 19/176* (2014.01)

(52) U.S. Cl.
CPC ......... *H04N 19/147* (2014.11); *H04N 19/176* (2014.11)

(58) Field of Classification Search
CPC ........................... H04N 19/147; H04N 19/176
See application file for complete search history.

(56) References Cited

U.S. PATENT DOCUMENTS 9,716,890 B2 7/2017 Kim et al.
9,918,101 B2 3/2018 Park et al.

(Continued)

FOREIGN PATENT DOCUMENTS

CN 102342102 A 2/2012
CN 104185988 A 12/2014

(Continued)

OTHER PUBLICATIONS

Chen et al., Algorithm Description of Joint Exploration Test Model 7 (JEM 7), Joint Video Exploration Team (JVET) of ITU-T SG16 WP3 and ISO/IEC JTC1/SC29/WG11, JVET-G1001-v1, 7th Meeting: Torino, Italy, Jul. 13-21, 2017, 48 pages.

(Continued)

*Primary Examiner* — Hesham K Abouzahra
(74) *Attorney, Agent, or Firm* — Birch, Stewart, Kolasch & Birch, LLP

(57) ABSTRACT

An image decoding/encoding method and apparatus are discussed. An image decoding method can include deriving a sub-block based temporal merge candidate of a current block based on a collocated block in a collocated picture, generating a sub-block based merge candidate list based on the sub-block based temporal merge candidate of the current block, deriving a motion vector for each of a plurality of sub-blocks of the current block based on the sub-block based merge candidate list, and deriving prediction samples of the plurality of sub-blocks of the current block based on the motion vector for each of a plurality of sub-blocks.

3 Claims, 9 Drawing Sheets

Related U.S. Application Data continuation of application No. 17/961,114, filed on Oct. 6, 2022, now Pat. No. 12,010,326, which is a continuation of application No. 16/650,885, filed as application No. PCT/KR2018/011490 on Sep. 28, 2018, now Pat. No. 11,509,907.

(56) References Cited

U.S. PATENT DOCUMENTS

| | | | | |
|---|---|---|---|---|
| 10,194,133 | B2 | 1/2019 | Bang et al. | |
| 2010/0166073 | A1 | 7/2010 | Schmit et al. | |
| 2014/0241435 | A1 | 8/2014 | Park et al. | |
| 2014/0307789 | A1 | 10/2014 | Kim et al. | |
| 2015/0208086 | A1 | 7/2015 | Chen et al. | |
| 2015/0229947 | A1 | 8/2015 | Park et al. | |
| 2015/0271489 | A1 | 9/2015 | Sugio et al. | |
| 2016/0323573 | A1 | 11/2016 | Ikai | |
| 2017/0332095 | A1 | 11/2017 | Zou et al. | |
| 2017/0332097 | A1 | 11/2017 | Lee et al. | |
| 2018/0176596 | A1 | 6/2018 | Jeong et al. | |
| 2020/0137413 | A1* | 4/2020 | Esenlik | H04N 19/436 |
| 2020/0162743 | A1 | 5/2020 | Park et al. | |
| 2020/0177911 | A1* | 6/2020 | Aono | H04N 19/563 |
| 2020/0221077 | A1* | 7/2020 | Park | H04N 19/513 |
| 2020/0296380 | A1 | 9/2020 | Aono et al. | |
| 2021/0195185 | A1* | 6/2021 | Raut | H04N 19/52 |

FOREIGN PATENT DOCUMENTS

| | | | |
|---|---|---|---|
| CN | 105247858 | A | 1/2016 |
| CN | 105308967 | A | 2/2016 |
| CN | 104837024 | B | 4/2016 |
| CN | 105637870 | A | 6/2016 |
| CN | 107113446 | A | 8/2017 |
| CN | 104041043 | B | 4/2018 |
| CN | 107197272 | B | 12/2019 |
| IN | 5041/DELNP/2011 | A | 4/2012 |
| KR | 10-1197176 | B1 | 11/2012 |
| KR | 10-2013-0028633 | A | 3/2013 |
| KR | 10-2013-0048122 | A | 5/2013 |
| KR | 10-2014-0005099 | A | 1/2014 |
| KR | 10-2014-0018953 | A | 2/2014 |
| KR | 10-2014-0043730 | A | 4/2014 |
| KR | 10-2014-0082969 | A | 7/2014 |
| KR | 10-2014-0136413 | A | 11/2014 |
| KR | 10-2015-0065845 | A | 6/2015 |
| KR | 10-2016-0109984 | A | 9/2016 |
| KR | 10-1782153 | B1 | 9/2017 |
| KR | 10-2023-0114253 | A | 8/2023 |
| KR | 10-2024-0105354 | A | 7/2024 |
| KR | 10-2024-0105356 | A | 7/2024 |
| WO | WO2010/078212 | A1 | 7/2010 |
| WO | WO 2015/113245 | A1 | 8/2015 |
| WO | WO 2015/137783 | A1 | 9/2015 |
| WO | WO2016/195453 | A1 | 12/2016 |
| WO | WO 2017/084512 | A1 | 5/2017 |

OTHER PUBLICATIONS

Collaborative Search Report in Korean Application No. 10-2023-0094829, mail on Feb. 14, 2024, 2 pages.

International Preliminary Report on Patentability in International Application No. PCT/KR2018/011490, issued on Mar. 31, 2020, 14 pages (with English translation).

International Search Report issued on Jan. 10, 2019 in corresponding International Patent Application No. PCT/KR2018/011490 (3 pages in English, 3 pages in Korean).

Kim et al., "CU-based Merge Candidate List Construction," Joint Collaborative Team on Video Coding, (JCT-VC) of ITU-T SG16 WP3 and ISO/IEC JTC1/SC29/WG11, JCTVC-G416, 7th Meeting: Geneva, Nov. 21-30, 2011, 13 pages.

Zhou, "Parallelized merge/skip mode for HEVC," Joint Collaborative Team on Video Coding, of ITU-T SG16 WP3 and ISO/IEC JTC1/SC29/WG11, JCTVC-F069, 6th Meeting: Torino, Italy, Jul. 14-22, 2011, 13 pages.

Han et al., "CE4.2.16: Sub-block merge candidates in BMS and JEM," Joint Video Exploration Team (JVET) of ITU-T SG 16 WP 3 and ISO/IEC JTC 1/SC 29/WG 11, ver. 1, Jul. 3, 2018, pp. 1-5.

Chinese Office Action and Search Report for Chinese Application No. 202311040525.3, dated Apr. 30, 2026, with English translation of the Office Action.

Chinese Office Action and Search Report for Chinese Application No. 202311040702.8, dated May 7, 2026, with English translation of the Office Action.

* cited by examiner 300
310
320
LCU
qaud partition information = 0
2N
2N
qaud partition information = 1
0
1
2
3
N
N
Depth = 0, N=32
qaud partition information = 0
qaud partition information = 1
Depth = 1, N=16
SCU
No qaud partition information
2N
2N
Depth = 3, N=4
16
16
8
16
8
8
16
8
16
32

FIG. 8
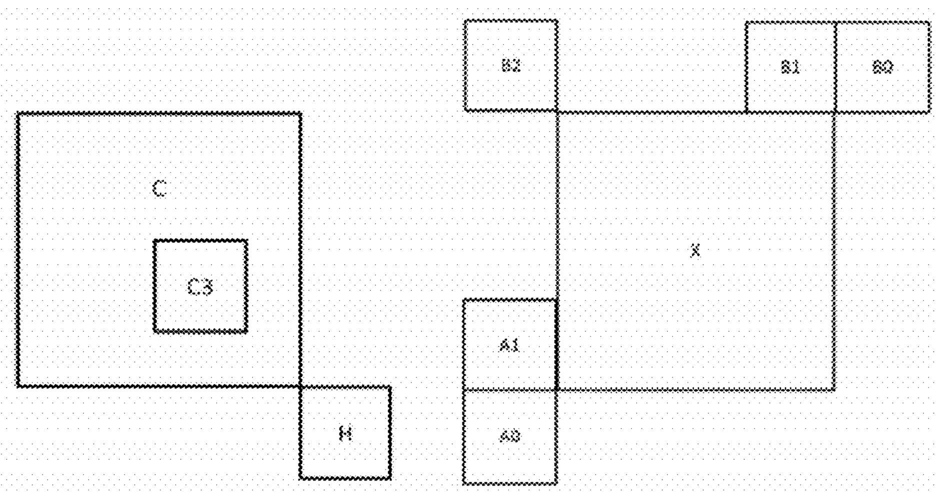
FIG. 9
FIG. 10
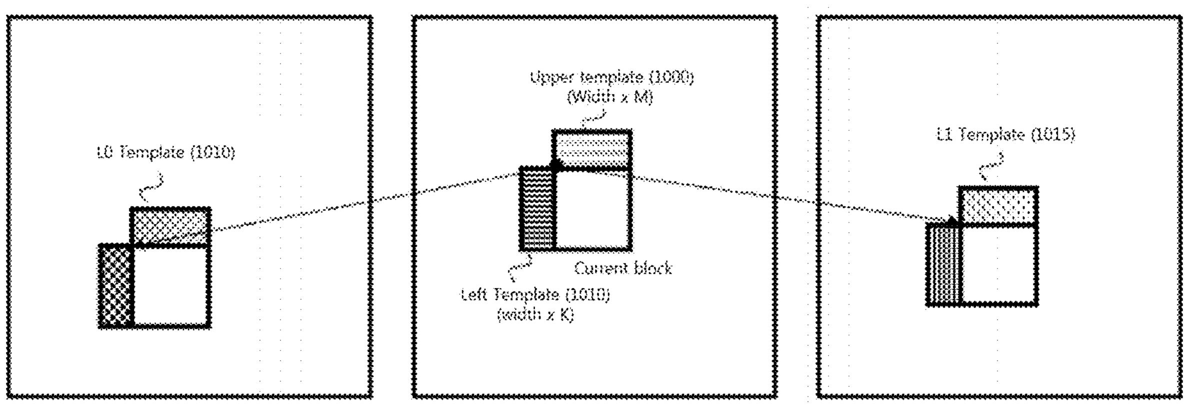

IMAGE ENCODING/DECODING METHOD AND APPARATUS, AND RECORDING MEDIUM FOR STORING BITSTREAM

CROSS-REFERENCE TO RELATED APPLICATIONS

This application is a Continuation of U.S. application Ser. No. 18/626,903 filed on Apr. 4, 2024 (now U.S. Pat. No. 12,519,949 issued on Jan. 6, 2026), which is a Continuation of U.S. application Ser. No. 17/961,114 filed on Oct. 6, 2022 (now U.S. Pat. No. 12,010,326 issued on Jun. 11, 2024), which is a Continuation of U.S. application Ser. No. 16/650,885 filed on Mar. 26, 2020 (now U.S. Pat. No. 11,509,907 issued on Nov. 22, 2022), which is a U.S. National Stage Application of International Application No. PCT/KR2018/011490, filed on Sep. 28, 2018, which claims the benefit under 35 USC 119(a) and 365(b) of Korean Patent Application No. 10-2017-0128130, filed on Sep. 29, 2017 in the Korean Intellectual Property Office, the entire disclosures of all these applications being hereby expressly incorporated by reference into the present application.

BACKGROUND

Technical Field

The present invention relates to an image encoding/decoding method and apparatus. More particularly, the present invention relates to an image encoding/decoding method and apparatus using a reconfigured merge candidate list when performing inter-prediction, and a recording medium storing a bitstream generated by an image encoding method and apparatus of the present invention.

Discussion of the Background Art

Recently, demands for high-resolution and high-quality images such as high definition (HD) images and ultra high definition (UHD) images, have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques are required for higher-resolution and higher-quality images.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; a transform and quantization technique for compressing energy of a residual signal; an entropy encoding technique of assigning a short code to a value with a high appearance frequency and assigning a long code to a value with a low appearance frequency; etc. Image data may be effectively compressed by using such image compression technology, and may be transmitted or stored.

SUMMARY OF THE DISCLOSURE

An object of the present invention is to provide an image encoding/decoding method and apparatus with improved compression efficiency, and a recording medium storing a bitstream generated by an image encoding/decoding method and apparatus of the present invention.

In addition, another object of the present invention is to provide an image encoding/decoding method and apparatus using inter-prediction with improved compression efficiency, and a recording medium storing a bitstream generated by an image encoding/decoding method and apparatus of the present invention.

In addition, still another object of the present invention is to provide an image encoding/decoding method efficiently performing inter-prediction by using a reconfigured merge candidate list, and a recording medium storing a bitstream generated by an image encoding/decoding method and apparatus of the present invention.

A method of decoding an image of the present invention may comprise deriving at least one merge candidate of a current block, generating an initial merge candidate list of the current block by using the derived at least one merge candidate and generating a reconfigured merge candidate list by using the initial merge candidate list.

In the method of decoding an image of the present invention, the generating of the reconfigure merge candidate list may include a calculating a distortion value of the merge candidate by using a neighbor block of the current block and the merge candidate and reconfiguring the initial merge candidate list based on the distortion value.

In the method of decoding an image of the present invention, the initial merge candidate list, includes at least one of a spatial merge candidate, a temporal merge candidate, a sub-block based temporal merge candidate, a sub-block based temporal-spatial combined merge candidate, a combined merge candidate, and a zero merge candidate of the current block.

In the method of decoding an image of the present invention, the distortion value is calculated by using at least one of SAD (sum of absolute differences), SATD (sum of absolute transformed differences), and MR-SAD (mean removed sum of absolute difference) between a neighbor block of the current block and a neighbor block of a reference block of the current block.

In the method of decoding an image of the present invention, the distortion value is calculated based on at least one of a neighbor block of a reference block in an L0 direction which is indicated by L0 direction motion information of the merge candidate, and a neighbor block of a reference block in an L1 direction which is indicated by L1 direction motion information of the merge candidate.

In the method of decoding an image of the present invention, the distortion value is calculated based on a neighbor block of a reference block indicated by a motion vector obtained by applying a preset offset to a motion vector of the merge candidate.

In the method of decoding an image of the present invention, when the merge candidate includes both of L0 direction motion information and L1 direction motion information, the distortion value is calculated by a distortion value between the neighbor block of the reference block in the L0 direction and the neighbor block of the reference block in the L1 direction.

In the method of decoding an image of the present invention, when the merge candidate includes any one piece of motion information of L0 direction motion information and L1 direction motion information, the distortion value is calculated by a distortion value between a neighbor block of a reference block indicated by motion information derived by applying mirroring to the motion information, and a neighbor block of a reference block by the motion information.

In the method of decoding an image of the present invention, when the merge candidate includes both of the L0 direction motion information and the L1 direction motion information, the distortion value is calculated by a distortion value between a neighbor block of a reference block indicated by motion information derived by applying mirroring to the L0 direction motion information, and a neighbor block of a reference block indicated by motion information derived by applying mirroring to the L1 direction motion information.

In the method of decoding an image of the present invention, wherein the reconfigured merge candidate list is generated by rearranging by size distortion values of one or more merge candidates included in the initial merge candidate list.

In the method of decoding an image of the present invention, the merge candidate that becomes a target to be rearranged is determined according to an order of one or more merge candidates included in the initial merge candidate list.

In the method of decoding an image of the present invention, wherein a number of merge candidates that become a target to be rearranged is a predefined value.

In the method of decoding an image of the present invention, further comprising entropy decoding motion estimation information of the current block, wherein the motion estimation information of the current block includes information indicating whether or not to reconfigure the initial merge candidate list.

In the method of decoding an image of the present invention, whether or not to reconfigure the initial merge candidate list is determined based on at least one of a size and a division form of the current block.

In the method of encoding an image of the present invention, the method may comprise deriving at least one merge candidate of a current block, generating an initial merge candidate list of the current block by using the derived at least one merge candidate and generating a reconfigured merge candidate list by using the initial merge candidate list.

In the non-temporary storage medium of the present invention, including a bitstream, wherein the bitstream is generated by an image encoding method may include deriving at least one merge candidate of a current block, generating an initial merge candidate list of the current block by using the derived at least one merge candidate and generating a reconfigured merge candidate list by using the initial merge candidate list.

According to the present invention, there is provided an image encoding/decoding method and apparatus with improved compression efficiency, and a recording medium storing a bitstream generated by an image encoding/decoding method and apparatus of the present invention.

In addition, according to the present invention, there is provided an image encoding/decoding method and apparatus using inter-prediction with improved compression efficiency, and a recording medium storing a bitstream generated by an image encoding/decoding method and apparatus of the present invention.

In addition, according to the present invention, there is provided an image encoding/decoding method and apparatus efficiently performing inter-prediction by using a reconfigured merge candidate list, and a recording medium storing a bitstream generated by the image encoding/decoding method and apparatus of the present invention.

BRIEF DESCRIPTION OF THE DRAWINGS

FIG. 8 is a view showing a method of deriving a temporal merge candidate.

FIG. 9 is a view showing a method of deriving a sub-block based temporal-spatial combined merge candidate.

FIG. 10 is a view showing a method of determining a merge candidate list according to an embodiment of the present invention.

DETAILED DESCRIPTION OF THE EMBODIMENTS

Figure 1:
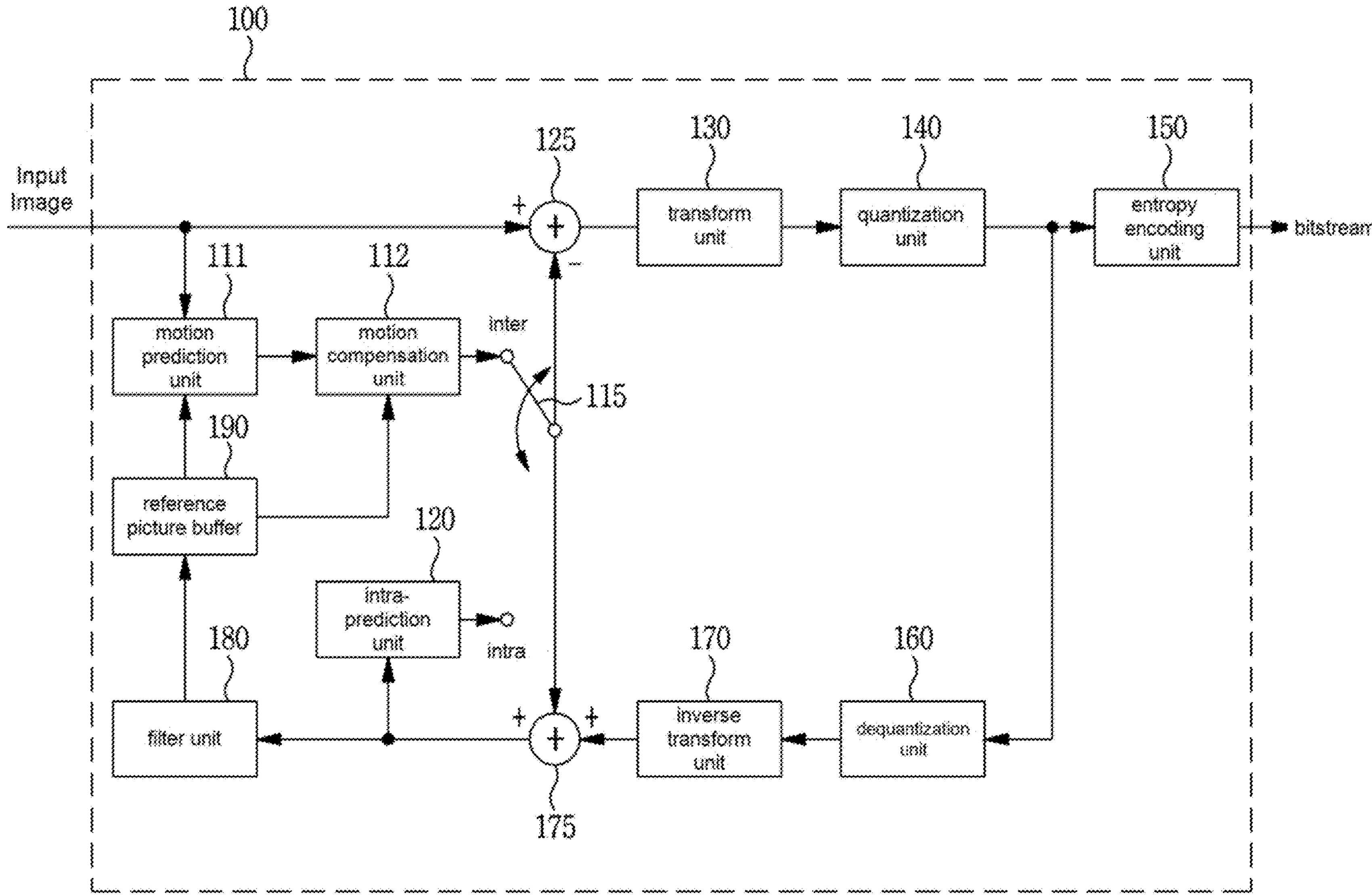
FIG. 1 is a block diagram showing a configuration of an encoding apparatus according to an embodiment to which the present invention is applied.

A variety of modifications may be made to the present invention and there are various embodiments of the present invention, examples of which will now be provided with reference to drawings and described in detail. However, the present invention is not limited thereto, although the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

Hereinafter, an image may mean a picture configuring a video, or may mean the video itself. For example, "encoding or decoding or both of an image" may mean "encoding or decoding or both of a moving picture", and may mean "encoding or decoding or both of one image among images of a moving picture."

Hereinafter, terms "moving picture" and "video" may be used as the same meaning and be replaced with each other.

Hereinafter, a target image may be an encoding target image which is a target of encoding and/or a decoding target image which is a target of decoding. Also, a target image may be an input image inputted to an encoding apparatus, and an input image inputted to a decoding apparatus. Here, a target image may have the same meaning with the current image.

Hereinafter, terms "image", "picture, "frame" and "screen" may be used as the same meaning and be replaced with each other.

Hereinafter, a target block may be an encoding target block which is a target of encoding and/or a decoding target block which is a target of decoding. Also, a target block may be the current block which is a target of current encoding and/or decoding. For example, terms "target block" and "current block" may be used as the same meaning and be replaced with each other.

Hereinafter, terms "block" and "unit" may be used as the same meaning and be replaced with each other. Or a "block" may represent a specific unit.

Hereinafter, terms "region" and "segment" may be replaced with each other.

Hereinafter, a specific signal may be a signal representing a specific block. For example, an original signal may be a signal representing a target block. A prediction signal may be a signal representing a prediction block. A residual signal may be a signal representing a residual block.

In embodiments, each of specific information, data, flag, index, element and attribute, etc. may have a value. A value of information, data, flag, index, element and attribute equal to "0" may represent a logical false or the first predefined value. In other words, a value "0", a false, a logical false and the first predefined value may be replaced with each other. A value of information, data, flag, index, element and attribute equal to "1" may represent a logical true or the second predefined value. In other words, a value "1", a true, a logical true and the second predefined value may be replaced with each other.

When a variable i or j is used for representing a column, a row or an index, a value of i may be an integer equal to or greater than 0, or equal to or greater than 1. That is, the column, the row, the index, etc. may be counted from 0 or may be counted from 1.

Description of Terms

Encoder: means an apparatus performing encoding. That is, means an encoding apparatus.

Decoder: means an apparatus performing decoding. That is, means an decoding apparatus.

Block: is an M×N array of a sample. Herein, M and N may mean positive integers, and the block may mean a sample array of a two-dimensional form. The block may refer to a unit. A current block my mean an encoding target block that becomes a target when encoding, or a decoding target block that becomes a target when decoding. In addition, the current block may be at least one of an encode block, a prediction block, a residual block, and a transform block.

Sample: is a basic unit constituting a block. It may be expressed as a value from 0 to $2^{Bd}-1$ according to a bit depth ($B_d$). In the present invention, the sample may be used as a meaning of a pixel. That is, a sample, a pel, a pixel may have the same meaning with each other.

Unit: may refer to an encoding and decoding unit. When encoding and decoding an image, the unit may be a region generated by partitioning a single image. In addition, the unit may mean a subdivided unit when a single image is partitioned into subdivided units during encoding or decoding. That is, an image may be partitioned into a plurality of units. When encoding and decoding an image, a predetermined process for each unit may be performed. A single unit may be partitioned into sub-units that have sizes smaller than the size of the unit. Depending on functions, the unit may mean a block, a macroblock, a coding tree unit, a code tree block, a coding unit, a coding block), a prediction unit, a prediction block, a residual unit), a residual block, a transform unit, a transform block, etc. In addition, in order to distinguish a unit from a block, the unit may include a luma component block, a chroma component block associated with the luma component block, and a syntax element of each color component block. The unit may have various sizes and forms, and particularly, the form of the unit may be a two-dimensional geometrical figure such as a square shape, a rectangular shape, a trapezoid shape, a triangular shape, a pentagonal shape, etc. In addition, unit information may include at least one of a unit type indicating the coding unit, the prediction unit, the transform unit, etc., and a unit size, a unit depth, a sequence of encoding and decoding of a unit, etc.

Coding Tree Unit: is configured with a single coding tree block of a luma component Y, and two coding tree blocks related to chroma components Cb and Cr. In addition, it may mean that including the blocks and a syntax element of each block. Each coding tree unit may be partitioned by using at least one of a quad-tree partitioning method, a binary-tree partitioning method and ternary-tree partitioning method to configure a lower unit such as coding unit, prediction unit, transform unit, etc. It may be used as a term for designating a sample block that becomes a process unit when encoding/decoding an image as an input image. Here, the quad-tree may mean a quarternary-tree.

Coding Tree Block: may be used as a term for designating any one of a Y coding tree block, Cb coding tree block, and Cr coding tree block.

Neighbor Block: may mean a block adjacent to a current block. The block adjacent to the current block may mean a block that comes into contact with a boundary of the current block, or a block positioned within a predetermined distance from the current block. The neighbor block may mean a block adjacent to a vertex of the current block. Herein, the block adjacent to the vertex of the current block may mean a block vertically adjacent to a neighbor block that is horizontally adjacent to the current block, or a block horizontally adjacent to a neighbor block that is vertically adjacent to the current block.

Reconstructed Neighbor block: may mean a neighbor block adjacent to a current block and which has been already spatially/temporally encoded or decoded. Herein, the reconstructed neighbor block may mean a reconstructed neighbor unit. A reconstructed spatial neighbor block may be a block within a current picture and which has been already reconstructed through encoding or decoding or both. A reconstructed temporal neighbor block is a block at a corresponding position as the current block of the current picture within a reference image, or a neighbor block thereof.

Unit Depth: may mean a partitioned degree of a unit. In a tree structure, the highest node (Root Node) may correspond to the first unit which is not partitioned. Also, the highest node may have the least depth value. In this case, the highest node may have a depth of level 0. A node having a depth of level 1 may represent a unit generated by partitioning once the first unit. A node having a depth of level 2 may represent a unit generated by partitioning twice the first unit. A node having a depth of level n may represent a unit generated by partitioning n-times the first unit. A Leaf Node may be the lowest node and a node which cannot be partitioned further. A depth of a Leaf Node may be the maximum level. For example, a predefined value of the maximum level may be 3. A depth of a root node may be the lowest and a depth of a leaf node may be the deepest. In addition, when a unit is expressed as a tree structure, a level in which a unit is present may mean a unit depth.

Bitstream: may mean a bitstream including encoding image information.

Parameter Set: corresponds to header information among a configuration within a bitstream. At least one of a video parameter set, a sequence parameter set, a picture parameter set, and an adaptation parameter set may be included in a parameter set. In addition, a parameter set may include a slice header, and tile header information.

Parsing: may mean determination of a value of a syntax element by performing entropy decoding, or may mean the entropy decoding itself.

Symbol: may mean at least one of a syntax element, a coding parameter, and a transform coefficient value of an encoding/decoding target unit. In addition, the symbol may mean an entropy encoding target or an entropy decoding result.

Prediction Mode: may be information indicating a mode encoded/decoded with intra prediction or a mode encoded/decoded with inter prediction.

Prediction Unit: may mean a basic unit when performing prediction such as inter-prediction, intra-prediction, inter-compensation, intra-compensation, and motion compensation. A single prediction unit may be partitioned into a plurality of partitions having a smaller size, or may be partitioned into a plurality of lower prediction units. A plurality of partitions may be a basic unit in performing prediction or compensation. A partition which is generated by dividing a prediction unit may also be a prediction unit.

Prediction Unit Partition: may mean a form obtained by partitioning a prediction unit.

Reference Picture List: may mean a list including one or more reference pictures used for inter-picture prediction or motion compensation. LC (List Combined), L0 (List 0), L1 (List 1), L2 (List 2), L3 (List 3) and the like are types of reference picture lists. One or more reference picture lists may be used for inter-picture prediction.

Inter-picture prediction Indicator: may mean an inter-picture prediction direction (uni-directional prediction, bi-directional prediction, and the like) of a current block. Alternatively, the inter-picture prediction indicator may mean the number of reference pictures used to generate a prediction block of a current block. Further alternatively, the inter-picture prediction indicator may mean the number of prediction blocks used to perform inter-picture prediction or motion compensation with respect to a current block.

Prediction list utilization flag: may represent whether a prediction block is generated using at least one reference image included in a specific reference picture list. An inter prediction indicator may be derived using a prediction list utilization flag, and reversely, a prediction list utilization flag may be derived using an inter prediction indicator. For example, when a prediction list utilization flag indicates a first value of "0", it represents a prediction block is not generated using a reference picture included in the corresponding reference picture list. When a prediction list utilization flag indicates a second value of "1", it represents a prediction block is generated using a reference picture included in the corresponding reference picture list.

Reference Picture Index: may mean an index indicating a specific reference picture in a reference picture list.

Reference Picture: may mean a picture to which a specific block refers for inter-picture prediction or motion compensation. Alternatively, a reference picture may be a picture including a reference block referred to by a current block for inter prediction or motion compensation. Hereinafter, the term "reference picture" and "reference image" may be used as the same meaning and used interchangeably.

Motion Vector: is a two-dimensional vector used for inter-picture prediction or motion compensation and may mean an offset between a reference picture and an encoding/decoding target picture. For example, (mvX, mvY) may represent a motion vector, mvX may represent a horizontal component, and mvY may represent a vertical component.

Search Range: may be a 2-dimensional region where search for a motion vector during inter prediction is performed. For example, a size of a search range may be M×N. M and N may be a positive integer, respectively.

Motion Vector Candidate: may mean a block that becomes a prediction candidate when predicting a motion vector, or a motion vector of the block. A motion vector candidate may be listed in a motion vector candidate list.

Motion Vector Candidate List: may mean a list configured using one or more motion vector candidates.

Motion Vector Candidate Index: means an indicator indicating a motion vector candidate in a motion vector candidate list. It is also referred to as an index of a motion vector predictor.

Motion Information: may mean information including a motion vector, a reference picture index, an inter-picture prediction indicator, and at least any one among reference picture list information, a reference picture, a motion vector candidate, a motion vector candidate index, a merge candidate, and a merge index.

Merge Candidate List: may mean a list composed of merge candidates.

Merge Candidate: may mean a spatial merge candidate, a temporal merge candidate, a combined merge candidate, a combined bi-prediction merge candidate, a zero merge candidate, or the like. The merge candidate may have an inter-picture prediction indicator, a reference picture index for each list, and motion information such as a motion vector.

Merge Index: may mean an indicator indicating a merge candidate within a merge candidate list. The merge index may indicate a block used to derive a merge candidate, among reconstructed blocks spatially and/or temporally adjacent to a current block. The merge index may indicate at least one item in the motion information possessed by a merge candidate.

Transform Unit: may mean a basic unit when performing encoding/decoding such as transform, inverse-transform, quantization, dequantization, transform coefficient encoding/decoding of a residual signal. A single transform unit may be partitioned into a plurality of lower-level transform units having a smaller size. Here, transformation/inverse-transformation may comprise at least one among the first transformation/the first inverse-transformation and the second transformation/the second inverse-transformation.

Scaling: may mean a process of multiplying a quantized level by a factor. A transform coefficient may be generated by scaling a quantized level. The scaling also may be referred to as dequantization.

Quantization Parameter: may mean a value used when generating a quantized level using a transform coefficient during quantization. The quantization parameter also may mean a value used when generating a transform coefficient by scaling a quantized level during dequantization. The quantization parameter may be a value mapped on a quantization step size.

Delta Quantization Parameter: may mean a difference value between a predicted quantization parameter and a quantization parameter of an encoding/decoding target unit.

Scan: may mean a method of sequencing coefficients within a unit, a block or a matrix. For example, changing a two-dimensional matrix of coefficients into a one-dimensional matrix may be referred to as scanning, and changing a one-dimensional matrix of coefficients into a two-dimensional matrix may be referred to as scanning or inverse scanning.

Transform Coefficient: may mean a coefficient value generated after transform is performed in an encoder. It may mean a coefficient value generated after at least one of entropy decoding and dequantization is performed in a decoder. A quantized level obtained by quantizing a transform coefficient or a residual signal, or a quantized transform coefficient level also may fall within the meaning of the transform coefficient.

Quantized Level: may mean a value generated by quantizing a transform coefficient or a residual signal in an encoder. Alternatively, the quantized level may mean a value that is a dequantization target to undergo dequantization in a decoder. Similarly, a quantized transform coefficient level that is a result of transform and quantization also may fall within the meaning of the quantized level.

Non-zero Transform Coefficient: may mean a transform coefficient having a value other than zero, or a transform coefficient level or a quantized level having a value other than zero.

Quantization Matrix: may mean a matrix used in a quantization process or a dequantization process performed to improve subjective or objective image quality. The quantization matrix also may be referred to as a scaling list.

Quantization Matrix Coefficient: may mean each element within a quantization matrix. The quantization matrix coefficient also may be referred to as a matrix coefficient.

Default Matrix: may mean a predetermined quantization matrix preliminarily defined in an encoder or a decoder.

Non-default Matrix: may mean a quantization matrix that is not preliminarily defined in an encoder or a decoder but is signaled by a user.

Statistic Value: a statistic value for at least one among a variable, an encoding parameter, a constant value, etc. which have a computable specific value may be one or more among an average value, a weighted average value, a weighted sum value, the minimum value, the maximum value, the most frequent value, a median value, an interpolated value of the corresponding specific values.

FIG. 1 is a block diagram showing a configuration of an encoding apparatus according to an embodiment to which the present invention is applied.

An encoding apparatus 100 may be an encoder, a video encoding apparatus, or an image encoding apparatus. A video may include at least one image. The encoding apparatus 100 may sequentially encode at least one image.

Referring to FIG. 1, the encoding apparatus 100 may include a motion prediction unit 111, a motion compensation unit 112, an intra-prediction unit 120, a switch 115, a subtractor 125, a transform unit 130, a quantization unit 140, an entropy encoding unit 150, a dequantization unit 160, an inverse-transform unit 170, an adder 175, a filter unit 180, and a reference picture buffer 190.

The encoding apparatus 100 may perform encoding of an input image by using an intra mode or an inter mode or both. In addition, encoding apparatus 100 may generate a bitstream including encoded information through encoding the input image, and output the generated bitstream. The generated bitstream may be stored in a computer readable recording medium, or may be streamed through a wired/wireless transmission medium. When an intra mode is used as a prediction mode, the switch 115 may be switched to an intra. Alternatively, when an inter mode is used as a prediction mode, the switch 115 may be switched to an inter mode. Herein, the intra mode may mean an intra-prediction mode, and the inter mode may mean an inter-prediction mode. The encoding apparatus 100 may generate a prediction block for an input block of the input image. In addition, the encoding apparatus 100 may encode a residual block using a residual of the input block and the prediction block after the prediction block being generated. The input image may be called as a current image that is a current encoding target. The input block may be called as a current block that is current encoding target, or as an encoding target block.

When a prediction mode is an intra mode, the intra-prediction unit 120 may use a sample of a block that has been already encoded/decoded and is adjacent to a current block as a reference sample. The intra-prediction unit 120 may perform spatial prediction for the current block by using a reference sample, or generate prediction samples of an input block by performing spatial prediction. Herein, the intra prediction may mean intra-prediction, When a prediction mode is an inter mode, the motion prediction unit 111 may retrieve a region that best matches with an input block from a reference image when performing motion prediction, and deduce a motion vector by using the retrieved region. In this case, a search region may be used as the region. The reference image may be stored in the reference picture buffer 190. Here, when encoding/decoding for the reference image is performed, it may be stored in the reference picture buffer 190.

The motion compensation unit 112 may generate a prediction block by performing motion compensation for the current block using a motion vector. Herein, inter-prediction may mean inter-prediction or motion compensation.

When the value of the motion vector is not an integer, the motion prediction unit 111 and the motion compensation unit 112 may generate the prediction block by applying an interpolation filter to a partial region of the reference picture. In order to perform inter-picture prediction or motion compensation on a coding unit, it may be determined that which mode among a skip mode, a merge mode, an advanced motion vector prediction (AMVP) mode, and a current picture referring mode is used for motion prediction and motion compensation of a prediction unit included in the corresponding coding unit. Then, inter-picture prediction or motion compensation may be differently performed depending on the determined mode.

The subtractor 125 may generate a residual block by using a residual of an input block and a prediction block. The residual block may be called as a residual signal. The residual signal may mean a difference between an original signal and a prediction signal. In addition, the residual signal may be a signal generated by transforming or quantizing, or transforming and quantizing a difference between the original signal and the prediction signal. The residual block may be a residual signal of a block unit.

The transform unit 130 may generate a transform coefficient by performing transform of a residual block, and output the generated transform coefficient. Herein, the transform coefficient may be a coefficient value generated by performing transform of the residual block. When a transform skip mode is applied, the transform unit 130 may skip transform of the residual block.

A quantized level may be generated by applying quantization to the transform coefficient or to the residual signal. Hereinafter, the quantized level may be also called as a transform coefficient in embodiments.

The quantization unit 140 may generate a quantized level by quantizing the transform coefficient or the residual signal according to a parameter, and output the generated quantized level. Herein, the quantization unit 140 may quantize the transform coefficient by using a quantization matrix.

The entropy encoding unit 150 may generate a bitstream by performing entropy encoding according to a probability distribution on values calculated by the quantization unit 140 or on coding parameter values calculated when performing encoding, and output the generated bitstream. The entropy encoding unit 150 may perform entropy encoding of sample information of an image and information for decoding an image. For example, the information for decoding the image may include a syntax element.

When entropy encoding is applied, symbols are represented so that a smaller number of bits are assigned to a symbol having a high chance of being generated and a larger number of bits are assigned to a symbol having a low chance of being generated, and thus, the size of bit stream for symbols to be encoded may be decreased. The entropy encoding unit 150 may use an encoding method for entropy encoding such as exponential Golomb, context-adaptive variable length coding (CAVLC), context-adaptive binary arithmetic coding (CABAC), etc. For example, the entropy encoding unit 150 may perform entropy encoding by using a variable length coding/code (VLC) table. In addition, the entropy encoding unit 150 may deduce a binarization method of a target symbol and a probability model of a target symbol/bin, and perform arithmetic coding by using the deduced binarization method, and a context model.

In order to encode a transform coefficient level (quantized level), the entropy encoding unit 150 may change a two-dimensional block form coefficient into a one-dimensional vector form by using a transform coefficient scanning method.

A coding parameter may include information (flag, index, etc.) such as syntax element that is encoded in an encoder and signaled to a decoder, and information derived when performing encoding or decoding. The coding parameter may mean information required when encoding or decoding an image. For example, at least one value or a combination form of a unit/block size, a unit/block depth, unit/block partition information, unit/block shape, unit/block partition structure, whether to partition of a quad-tree form, whether to partition of a binary-tree form, a partition direction of a binary-tree form (horizontal direction or vertical direction), a partition form of a binary-tree form (symmetric partition or asymmetric partition), whether or not a current coding unit is partitioned by ternary tree partitioning, direction (horizontal or vertical direction) of the ternary tree partitioning, type (symmetric or asymmetric type) of the ternary tree partitioning, whether a current coding unit is partitioned by multi-type tree partitioning, direction (horizontal or vertical direction) of the multi-type three partitioning, type (symmetric or asymmetric type) of the multi-type tree partitioning, and a tree (binary tree or ternary tree) structure of the multi-type tree partitioning, a prediction mode (intra prediction or inter prediction), a luma intra-prediction mode/direction, a chroma intra-prediction mode/direction, intra partition information, inter partition information, a coding block partition flag, a prediction block partition flag, a transform block partition flag, a reference sample filtering method, a reference sample filter tab, a reference sample filter coefficient, a prediction block filtering method, a prediction block filter tap, a prediction block filter coefficient, a prediction block boundary filtering method, a prediction block boundary filter tab, a prediction block boundary filter coefficient, an intra-prediction mode, an inter-prediction mode, motion information, a motion vector, a motion vector difference, a reference picture index, a inter-prediction angle, an inter-prediction indicator, a prediction list utilization flag, a reference picture list, a reference picture, a motion vector predictor index, a motion vector predictor candidate, a motion vector candidate list, whether to use a merge mode, a merge index, a merge candidate, a merge candidate list, whether to use a skip mode, an interpolation filter type, an interpolation filter tab, an interpolation filter coefficient, a motion vector size, a presentation accuracy of a motion vector, a transform type, a transform size, information of whether or not a primary(first) transform is used, information of whether or not a secondary transform is used, a primary transform index, a secondary transform index, information of whether or not a residual signal is present, a coded block pattern, a coded block flag(CBF), a quantization parameter, a quantization parameter residue, a quantization matrix, whether to apply an intra loop filter, an intra loop filter coefficient, an intra loop filter tab, an intra loop filter shape/form, whether to apply a deblocking filter, a deblocking filter coefficient, a deblocking filter tab, a deblocking filter strength, a deblocking filter shape/form, whether to apply an adaptive sample offset, an adaptive sample offset value, an adaptive sample offset category, an adaptive sample offset type, whether to apply an adaptive loop filter, an adaptive loop filter coefficient, an adaptive loop filter tab, an adaptive loop filter shape/form, a binarization/inverse-binarization method, a context model determining method, a context model updating method, whether to perform a regular mode, whether to perform a bypass mode, a context bin, a bypass bin, a significant coefficient flag, a last significant coefficient flag, a coded flag for a unit of a coefficient group, a position of the last significant coefficient, a flag for whether a value of a coefficient is larger than 1, a flag for whether a value of a coefficient is larger than 2, a flag for whether a value of a coefficient is larger than 3, information on a remaining coefficient value, a sign information, a reconstructed luma sample, a reconstructed chroma sample, a residual luma sample, a residual chroma sample, a luma transform coefficient, a chroma transform coefficient, a quantized luma level, a quantized chroma level, a transform coefficient level scanning method, a size of a motion vector search area at a decoder side, a shape of a motion vector search area at a decoder side, a number of time of a motion vector search at a decoder side, information on a CTU size, information on a minimum block size, information on a maximum block size, information on a maximum block depth, information on a minimum block depth, an image displaying/outputting sequence, slice identification information, a slice type, slice partition information, tile identification information, a tile type, tile partition information, a picture type, a bit depth of an input sample, a bit depth of a reconstruction sample, a bit depth of a residual sample, a bit depth of a transform coefficient, a bit depth of a quantized level, and information on a luma signal or information on a chroma signal may be included in the coding parameter.

Herein, signaling the flag or index may mean that a corresponding flag or index is entropy encoded and included in a bitstream by an encoder, and may mean that the corresponding flag or index is entropy decoded from a bitstream by a decoder.

When the encoding apparatus 100 performs encoding through inter-prediction, an encoded current image may be used as a reference image for another image that is processed afterwards. Accordingly, the encoding apparatus 100 may reconstruct or decode the encoded current image, or store the reconstructed or decoded image as a reference image in reference picture buffer 190.

A quantized level may be dequantized in the dequantization unit 160, or may be inverse-transformed in the inverse-transform unit 170. A dequantized or inverse-transformed coefficient or both may be added with a prediction block by the adder 175. By adding the dequantized or inverse-transformed coefficient or both with the prediction block, a reconstructed block may be generated. Herein, the dequantized or inverse-transformed coefficient or both may mean a coefficient on which at least one of dequantization and inverse-transform is performed, and may mean a reconstructed residual block.

A reconstructed block may pass through the filter unit 180. The filter unit 180 may apply at least one of a deblocking filter, a sample adaptive offset (SAO), and an adaptive loop filter (ALF) to a reconstructed sample, a reconstructed block or a reconstructed image. The filter unit 180 may be called as an in-loop filter.

The deblocking filter may remove block distortion generated in boundaries between blocks. In order to determine whether or not to apply a deblocking filter, whether or not to apply a deblocking filter to a current block may be determined based samples included in several rows or columns which are included in the block. When a deblocking filter is applied to a block, another filter may be applied according to a required deblocking filtering strength.

In order to compensate an encoding error, a proper offset value may be added to a sample value by using a sample adaptive offset. The sample adaptive offset may correct an offset of a deblocked image from an original image by a sample unit. A method of partitioning samples of an image into a predetermined number of regions, determining a region to which an offset is applied, and applying the offset to the determined region, or a method of applying an offset in consideration of edge information on each sample may be used.

The adaptive loop filter may perform filtering based on a comparison result of the filtered reconstructed image and the original image. Samples included in an image may be partitioned into predetermined groups, a filter to be applied to each group may be determined, and differential filtering may be performed for each group. Information of whether or not to apply the ALF may be signaled by coding units (CUs), and a form and coefficient of the ALF to be applied to each block may vary.

The reconstructed block or the reconstructed image having passed through the filter unit 180 may be stored in the reference picture buffer 190. A reconstructed block processed by the filter unit 180 may be a part of a reference image. That is, a reference image is a reconstructed image composed of reconstructed blocks processed by the filter unit 180. The stored reference image may be used later in inter prediction or motion compensation.

Figure 2:
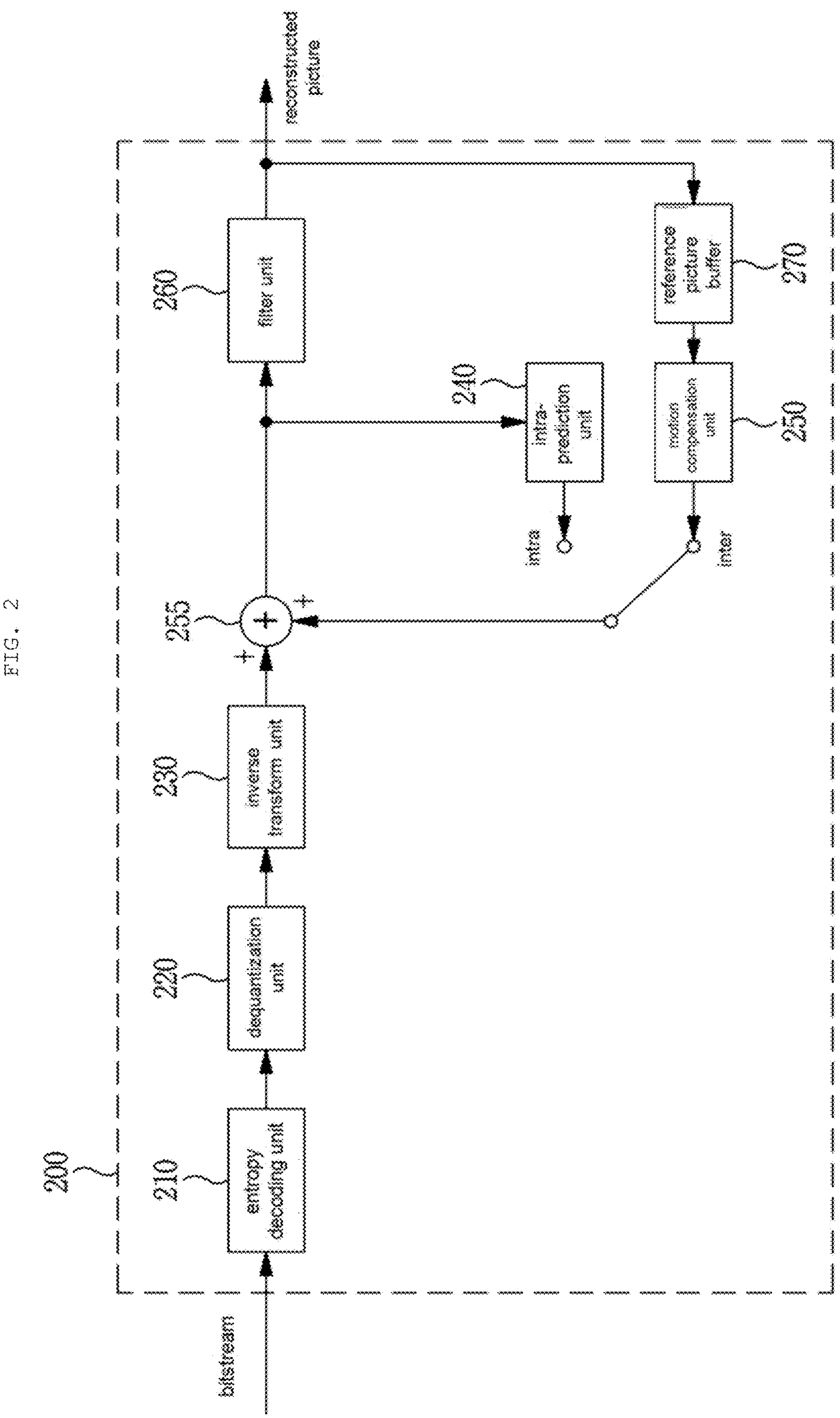
FIG. 2 is a block diagram showing a configuration of a decoding apparatus according to an embodiment and to which the present invention is applied.

FIG. 2 is a block diagram showing a configuration of a decoding apparatus according to an embodiment and to which the present invention is applied.

A decoding apparatus 200 may a decoder, a video decoding apparatus, or an image decoding apparatus.

Referring to FIG. 2, the decoding apparatus 200 may include an entropy decoding unit 210, a dequantization unit 220, an inverse-transform unit 230, an intra-prediction unit 240, a motion compensation unit 250, an adder 225, a filter unit 260, and a reference picture buffer 270.

The decoding apparatus 200 may receive a bitstream output from the encoding apparatus 100. The decoding apparatus 200 may receive a bitstream stored in a computer readable recording medium, or may receive a bitstream that is streamed through a wired/wireless transmission medium. The decoding apparatus 200 may decode the bitstream by using an intra mode or an inter mode. In addition, the decoding apparatus 200 may generate a reconstructed image generated through decoding or a decoded image, and output the reconstructed image or decoded image.

When a prediction mode used when decoding is an intra mode, a switch may be switched to an intra. Alternatively, when a prediction mode used when decoding is an inter mode, a switch may be switched to an inter mode.

The decoding apparatus 200 may obtain a reconstructed residual block by decoding the input bitstream, and generate a prediction block. When the reconstructed residual block and the prediction block are obtained, the decoding apparatus 200 may generate a reconstructed block that becomes a decoding target by adding the reconstructed residual block with the prediction block. The decoding target block may be called a current block.

The entropy decoding unit 210 may generate symbols by entropy decoding the bitstream according to a probability distribution. The generated symbols may include a symbol of a quantized level form. Herein, an entropy decoding method may be an inverse-process of the entropy encoding method described above.

In order to decode a transform coefficient level (quantized level), the entropy decoding unit 210 may change a one-directional vector form coefficient into a two-dimensional block form by using a transform coefficient scanning method.

A quantized level may be dequantized in the dequantization unit 220, or inverse-transformed in the inverse-transform unit 230. The quantized level may be a result of dequantizing or inverse-transforming or both, and may be generated as a reconstructed residual block. Herein, the dequantization unit 220 may apply a quantization matrix to the quantized level.

When an intra mode is used, the intra-prediction unit 240 may generate a prediction block by performing, for the current block, spatial prediction that uses a sample value of a block adjacent to a decoding target block and which has been already decoded.

When an inter mode is used, the motion compensation unit 250 may generate a prediction block by performing, for the current block, motion compensation that uses a motion vector and a reference image stored in the reference picture buffer 270.

The adder 225 may generate a reconstructed block by adding the reconstructed residual block with the prediction block. The filter unit 260 may apply at least one of a deblocking filter, a sample adaptive offset, and an adaptive loop filter to the reconstructed block or reconstructed image. The filter unit 260 may output the reconstructed image. The reconstructed block or reconstructed image may be stored in the reference picture buffer 270 and used when performing inter-prediction. A reconstructed block processed by the filter unit 260 may be a part of a reference image. That is, a reference image is a reconstructed image composed of reconstructed blocks processed by the filter unit 260. The stored reference image may be used later in inter prediction or motion compensation.

Figure 3:
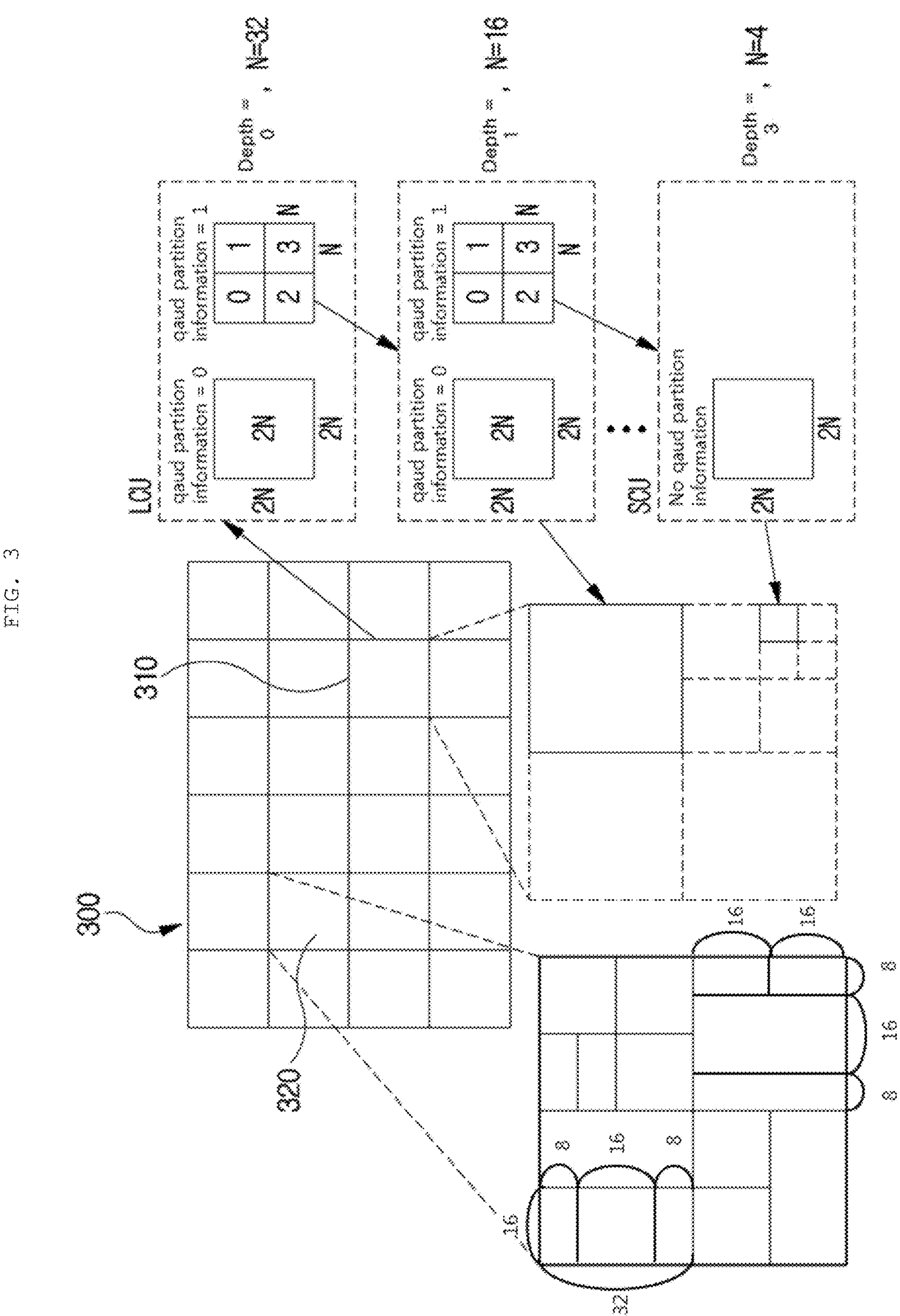
FIG. 3 is a view schematically showing a partition structure of an image when encoding and decoding the image.

FIG. 3 is a view schematically showing a partition structure of an image when encoding and decoding the image. FIG. 3 schematically shows an example of partitioning a single unit into a plurality of lower units.

In order to efficiently partition an image, when encoding and decoding, a coding unit (CU) may be used. The coding unit may be used as a basic unit when encoding/decoding the image. In addition, the coding unit may be used as a unit for distinguishing an intra prediction mode and an inter prediction mode when encoding/decoding the image. The coding unit may be a basic unit used for prediction, transform, quantization, inverse-transform, dequantization, or an encoding/decoding process of a transform coefficient.

Referring to FIG. 3, an image 300 is sequentially partitioned in a largest coding unit (LCU), and a LCU unit is determined as a partition structure. Herein, the LCU may be used in the same meaning as a coding tree unit (CTU). A unit partitioning may mean partitioning a block associated with to the unit. In block partition information, information of a unit depth may be included. Depth information may represent a number of times or a degree or both in which a unit is partitioned. A single unit may be partitioned into a plurality of lower level units hierarchically associated with depth information based on a tree structure. In other words, a unit and a lower level unit generated by partitioning the unit may correspond to a node and a child node of the node, respectively. Each of partitioned lower unit may have depth information. Depth information may be information representing a size of a CU, and may be stored in each CU. Unit depth represents times and/or degrees related to partitioning a unit. Therefore, partitioning information of a lower-level unit may comprise information on a size of the lower-level unit.

A partition structure may mean a distribution of a coding unit (CU) within an LCU 310. Such a distribution may be determined according to whether or not to partition a single CU into a plurality (positive integer equal to or greater than 2 including 2, 4, 8, 16, etc.) of CUs. A horizontal size and a vertical size of the CU generated by partitioning may respectively be half of a horizontal size and a vertical size of the CU before partitioning, or may respectively have sizes smaller than a horizontal size and a vertical size before partitioning according to a number of times of partitioning. The CU may be recursively partitioned into a plurality of CUs. By the recursive partitioning, at least one among a height and a width of a CU after partitioning may decrease comparing with at least one among a height and a width of a CU before partitioning. Partitioning of the CU may be recursively performed until to a predefined depth or predefined size. For example, a depth of an LCU may be 0, and a depth of a smallest coding unit (SCU) may be a predefined maximum depth. Herein, the LCU may be a coding unit having a maximum coding unit size, and the SCU may be a coding unit having a minimum coding unit size as described above. Partitioning is started from the LCU 310, a CU depth increases by 1 as a horizontal size or a vertical size or both of the CU decreases by partitioning. For example, for each depth, a CU which is not partitioned may have a size of 2N×2N. Also, in case of a CU which is partitioned, a CU with a size of 2N×2N may be partitioned into four CUs with a size of N×N. A size of N may decrease to half as a depth increase by 1.

In addition, information whether or not the CU is partitioned may be represented by using partition information of the CU. The partition information may be 1-bit information. All CUs, except for a SCU, may include partition information. For example, when a value of partition information is 1, the CU may not be partitioned, when a value of partition information is 2, the CU may be partitioned.

Referring to FIG. 3, an LCU having a depth 0 may be a 64×64 block. 0 may be a minimum depth. A SCU having a depth 3 may be an 8×8 block. 3 may be a maximum depth. A CU of a 32×32 block and a 16×16 block may be respectively represented as a depth 1 and a depth 2.

For example, when a single coding unit is partitioned into four coding units, a horizontal size and a vertical size of the four partitioned coding units may be a half size of a horizontal and vertical size of the CU before being partitioned. In one embodiment, when a coding unit having a 32×32 size is partitioned into four coding units, each of the four partitioned coding units may have a 16×16 size. When a single coding unit is partitioned into four coding units, it may be called that the coding unit may be partitioned into a quad-tree form.

For example, when one coding unit is partitioned into two sub-coding units, the horizontal or vertical size (width or height) of each of the two sub-coding units may be half the horizontal or vertical size of the original coding unit. For example, when a coding unit having a size of 32×32 is vertically partitioned into two sub-coding units, each of the two sub-coding units may have a size of 16×32. For example, when a coding unit having a size of 8×32 is horizontally partitioned into two sub-coding units, each of the two sub-coding units may have a size of 8×16. When one coding unit is partitioned into two sub-coding units, it can be said that the coding unit is binary-partitioned or is partitioned by a binary tree partition structure.

For example, when one coding unit is partitioned into three sub-coding units, the horizontal or vertical size of the coding unit can be partitioned with a ratio of 1:2:1, thereby producing three sub-coding units whose horizontal or vertical sizes are in a ratio of 1:2:1. For example, when a coding unit having a size of 16×32 is horizontally partitioned into three sub-coding units, the three sub-coding units may have sizes of 16×8, 16×16, and 16×8 respectively, in the order from the uppermost to the lowermost sub-coding unit. For example, when a coding unit having a size of 32×32 is vertically split into three sub-coding units, the three sub-coding units may have sizes of 8×32, 16×32, and 8×32, respectively in the order from the left to the right sub-coding unit. When one coding unit is partitioned into three sub-coding units, it can be said that the coding unit is ternary-partitioned or partitioned by a ternary tree partition structure.

In FIG. 3, a coding tree unit (CTU) 320 is an example of a CTU to which a quad tree partition structure, a binary tree partition structure, and a ternary tree partition structure are all applied.

As described above, in order to partition the CTU, at least one of a quad tree partition structure, a binary tree partition structure, and a ternary tree partition structure may be applied. Various tree partition structures may be sequentially applied to the CTU, according to a predetermined priority order. For example, the quad tree partition structure may be preferentially applied to the CTU. A coding unit that cannot be partitioned any longer using a quad tree partition structure may correspond to a leaf node of a quad tree. A coding unit corresponding to a leaf node of a quad tree may serve as a root node of a binary and/or ternary tree partition structure. That is, a coding unit corresponding to a leaf node of a quad tree may be further partitioned by a binary tree partition structure or a ternary tree partition structure, or may not be further partitioned. Therefore, by preventing a coding block that results from binary tree partitioning or ternary tree partitioning of a coding unit corresponding to a leaf node of a quad tree from undergoing further quad tree partitioning, block partitioning and/or signaling of partition information can be effectively performed.

The fact that a coding unit corresponding to a node of a quad tree is partitioned may be signaled using quad partition information. The quad partition information having a first value (e.g., "1") may indicate that a current coding unit is partitioned by the quad tree partition structure. The quad partition information having a second value (e.g., "0") may indicate that a current coding unit is not partitioned by the quad tree partition structure. The quad partition information may be a flag having a predetermined length (e.g., one bit).

There may not be a priority between the binary tree partitioning and the ternary tree partitioning. That is, a coding unit corresponding to a leaf node of a quad tree may further undergo arbitrary partitioning among the binary tree partitioning and the ternary tree partitioning. In addition, a coding unit generated through the binary tree partitioning or the ternary tree partitioning may undergo a further binary tree partitioning or a further ternary tree partitioning, or may not be further partitioned.

A tree structure in which there is no priority among the binary tree partitioning and the ternary tree partitioning is referred to as a multi-type tree structure. A coding unit corresponding to a leaf node of a quad tree may serve as a root node of a multi-type tree. Whether to partition a coding unit which corresponds to a node of a multi-type tree may be signaled using at least one of multi-type tree partition indication information, partition direction information, and partition tree information. For partitioning of a coding unit corresponding to a node of a multi-type tree, the multi-type tree partition indication information, the partition direction, and the partition tree information may be sequentially signaled.

The multi-type tree partition indication information having a first value (e.g., "1") may indicate that a current coding unit is to undergo a multi-type tree partitioning. The multi-type tree partition indication information having a second value (e.g., "0") may indicate that a current coding unit is not to undergo a multi-type tree partitioning.

When a coding unit corresponding to a node of a multi-type tree is further partitioned by a multi-type tree partition structure, the coding unit may include partition direction information. The partition direction information may indicate in which direction a current coding unit is to be partitioned for the multi-type tree partitioning. The partition direction information having a first value (e.g., "1") may indicate that a current coding unit is to be vertically partitioned. The partition direction information having a second value (e.g., "0") may indicate that a current coding unit is to be horizontally partitioned.

When a coding unit corresponding to a node of a multi-type tree is further partitioned by a multi-type tree partition structure, the current coding unit may include partition tree information. The partition tree information may indicate a tree partition structure which is to be used for partitioning of a node of a multi-type tree. The partition tree information having a first value (e.g., "1") may indicate that a current coding unit is to be partitioned by a binary tree partition structure. The partition tree information having a second value (e.g., "0") may indicate that a current coding unit is to be partitioned by a ternary tree partition structure.

The partition indication information, the partition tree information, and the partition direction information may each be a flag having a predetermined length (e.g., one bit).

At least any one of the quadtree partition indication information, the multi-type tree partition indication information, the partition direction information, and the partition tree information may be entropy encoded/decoded. For the entropy-encoding/decoding of those types of information, information on a neighboring coding unit adjacent to the current coding unit may be used. For example, there is a high probability that the partition type (the partitioned or non-partitioned, the partition tree, and/or the partition direction) of a left neighboring coding unit and/or an upper neighboring coding unit of a current coding unit is similar to that of the current coding unit. Therefore, context information for entropy encoding/decoding of the information on the current coding unit may be derived from the information on the neighboring coding units. The information on the neighboring coding units may include at least any one of quad partition information, multi-type tree partition indication information, partition direction information, and partition tree information.

As another example, among binary tree partitioning and ternary tree partitioning, binary tree partitioning may be preferentially performed. That is, a current coding unit may primarily undergo binary tree partitioning, and then a coding unit corresponding to a leaf node of a binary tree may be set as a root node for ternary tree partitioning. In this case, neither quad tree partitioning nor binary tree partitioning may not be performed on the coding unit corresponding to a node of a ternary tree.

A coding unit that cannot be partitioned by a quad tree partition structure, a binary tree partition structure, and/or a ternary tree partition structure becomes a basic unit for coding, prediction and/or transformation. That is, the coding unit cannot be further partitioned for prediction and/or transformation. Therefore, the partition structure information and the partition information used for partitioning a coding unit into prediction units and/or transformation units may not be present in a bit stream.

However, when the size of a coding unit (i.e., a basic unit for partitioning) is larger than the size of a maximum transformation block, the coding unit may be recursively partitioned until the size of the coding unit is reduced to be equal to or smaller than the size of the maximum transformation block. For example, when the size of a coding unit is 64×64 and when the size of a maximum transformation block is 32×32, the coding unit may be partitioned into four 32×32 blocks for transformation. For example, when the size of a coding unit is 32×64 and the size of a maximum transformation block is 32×32, the coding unit may be partitioned into two 32×32 blocks for the transformation. In this case, the partitioning of the coding unit for transformation is not signaled separately, and may be determined through comparison between the horizontal or vertical size of the coding unit and the horizontal or vertical size of the maximum transformation block. For example, when the horizontal size (width) of the coding unit is larger than the horizontal size (width) of the maximum transformation block, the coding unit may be vertically bisected. For example, when the vertical size (length) of the coding unit is larger than the vertical size (length) of the maximum transformation block, the coding unit may be horizontally bisected.

Information of the maximum and/or minimum size of the coding unit and information of the maximum and/or minimum size of the transformation block may be signaled or determined at an upper level of the coding unit. The upper level may be, for example, a sequence level, a picture level, a slice level, or the like. For example, the minimum size of the coding unit may be determined to be 4×4. For example, the maximum size of the transformation block may be determined to be 64×64. For example, the minimum size of the transformation block may be determined to be 4×4.

Information of the minimum size (quad tree minimum size) of a coding unit corresponding to a leaf node of a quad tree and/or information of the maximum depth (the maximum tree depth of a multi-type tree) from a root node to a leaf node of the multi-type tree may be signaled or determined at an upper level of the coding unit. For example, the upper level may be a sequence level, a picture level, a slice level, or the like. Information of the minimum size of a quad tree and/or information of the maximum depth of a multi-type tree may be signaled or determined for each of an intra-picture slice and an inter-picture slice.

Difference information between the size of a CTU and the maximum size of a transformation block may be signaled or determined at an upper level of the coding unit. For example, the upper level may be a sequence level, a picture level, a slice level, or the like. Information of the maximum size of the coding units corresponding to the respective nodes of a binary tree (hereinafter, referred to as a maximum size of a binary tree) may be determined based on the size of the coding tree unit and the difference information. The maximum size of the coding units corresponding to the respective nodes of a ternary tree (hereinafter, referred to as a maximum size of a ternary tree) may vary depending on the type of slice. For example, for an intra-picture slice, the maximum size of a ternary tree may be 32×32. For example, for an inter-picture slice, the maximum size of a ternary tree may be 128×128. For example, the minimum size of the coding units corresponding to the respective nodes of a binary tree (hereinafter, referred to as a minimum size of a binary tree) and/or the minimum size of the coding units corresponding to the respective nodes of a ternary tree (hereinafter, referred to as a minimum size of a ternary tree) may be set as the minimum size of a coding block.

As another example, the maximum size of a binary tree and/or the maximum size of a ternary tree may be signaled or determined at the slice level. Alternatively, the minimum size of the binary tree and/or the minimum size of the ternary tree may be signaled or determined at the slice level.

Depending on size and depth information of the above-described various blocks, quad partition information, multi-type tree partition indication information, partition tree information and/or partition direction information may be included or may not be included in a bit stream.

For example, when the size of the coding unit is not larger than the minimum size of a quad tree, the coding unit does not contain quad partition information. Thus, the quad partition information may be deduced from a second value.

For example, when the sizes (horizontal and vertical sizes) of a coding unit corresponding to a node of a multi-type tree are larger than the maximum sizes (horizontal and vertical sizes) of a binary tree and/or the maximum sizes (horizontal and vertical sizes) of a ternary tree, the coding unit may not be binary-partitioned or ternary-partitioned. Accordingly, the multi-type tree partition indication information may not be signaled but may be deduced from a second value.

Alternatively, when the sizes (horizontal and vertical sizes) of a coding unit corresponding to a node of a multi-type tree are the same as the maximum sizes (horizontal and vertical sizes) of a binary tree and/or are two times as large as the maximum sizes (horizontal and vertical sizes) of a ternary tree, the coding unit may not be further binary-partitioned or ternary-partitioned. Accordingly, the multi-type tree partition indication information may not be signaled but be derived from a second value. This is because when a coding unit is partitioned by a binary tree partition structure and/or a ternary tree partition structure, a coding unit smaller than the minimum size of a binary tree and/or the minimum size of a ternary tree is generated.

Alternatively, when the depth of a coding unit corresponding to a node of a multi-type tree is equal to the maximum depth of the multi-type tree, the coding unit may not be further binary-partitioned and/or ternary-partitioned. Accordingly, the multi-type tree partition indication information may not be signaled but may be deduced from a second value.

Alternatively, only when at least one of vertical direction binary tree partitioning, horizontal direction binary tree partitioning, vertical direction ternary tree partitioning, and horizontal direction ternary tree partitioning is possible for a coding unit corresponding to a node of a multi-type tree, the multi-type tree partition indication information may be signaled. Otherwise, the coding unit may not be binary-partitioned and/or ternary-partitioned. Accordingly, the multi-type tree partition indication information may not be signaled but may be deduced from a second value.

Alternatively, only when both of the vertical direction binary tree partitioning and the horizontal direction binary tree partitioning or both of the vertical direction ternary tree partitioning and the horizontal direction ternary tree partitioning are possible for a coding unit corresponding to a node of a multi-type tree, the partition direction information may be signaled. Otherwise, the partition direction information may not be signaled but may be derived from a value indicating possible partitioning directions.

Alternatively, only when both of the vertical direction binary tree partitioning and the vertical direction ternary tree partitioning or both of the horizontal direction binary tree partitioning and the horizontal direction ternary tree partitioning are possible for a coding tree corresponding to a node of a multi-type tree, the partition tree information may be signaled. Otherwise, the partition tree information may not be signaled but be deduced from a value indicating a possible partitioning tree structure.

Figure 4:
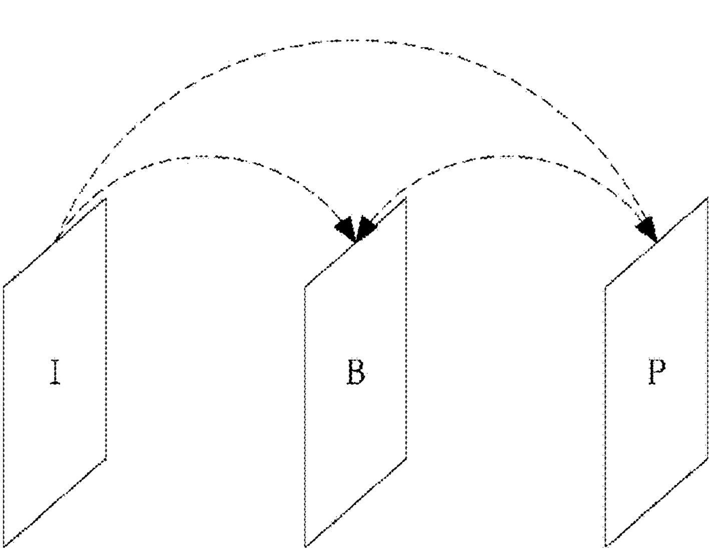
FIG. 4 is a diagram illustrating an embodiment of an inter-picture prediction process.

FIG. 4 is a diagram illustrating an embodiment of an inter-picture prediction process.

In FIG. 4, a rectangle may represent a picture. In FIG. 4, an arrow represents a prediction direction. Pictures may be categorized into intra pictures (I pictures), predictive pictures (P pictures), and Bi-predictive pictures (B pictures) according to the encoding type thereof.

The I picture may be encoded through intra-prediction without requiring inter-picture prediction. The P picture may be encoded through inter-picture prediction by using a reference picture that is present in one direction (i.e., forward direction or backward direction) with respect to a current block. The B picture may be encoded through inter-picture prediction by using reference pictures that are preset in two directions (i.e., forward direction and backward direction) with respect to a current block. When the inter-picture prediction is used, the encoder may perform inter-picture prediction or motion compensation and the decoder may perform the corresponding motion compensation.

Herein below, an embodiment of the inter-picture prediction will be described in detail.

The inter-picture prediction or motion compensation may be performed using a reference picture and motion information.

Motion information of a current block may be derived during inter-picture prediction by each of the encoding apparatus 100 and the decoding apparatus 200. The motion information of the current block may be derived by using motion information of a reconstructed neighboring block, motion information of a collocated block (also referred to as a col block or a co-located block), and/or a block adjacent to the co-located block. The co-located block may mean a block that is located spatially at the same position as the current block, within a previously reconstructed collocated picture (also referred to as a col picture or a co-located picture). The co-located picture may be one picture among one or more reference pictures included in a reference picture list.

A method of deriving the motion information of the current block may vary depending on a prediction mode of the current block. For example, as prediction modes for inter-picture prediction, there may be an AMVP mode, a merge mode, a skip mode, a current picture reference mode, etc. The merge mode may be referred to as a motion merge mode.

For example, when the AMVP is used as the prediction mode, at least one of motion vectors of the reconstructed neighboring blocks, motion vectors of the co-located blocks, motion vectors of blocks adjacent to the co-located blocks, and a (0, 0) motion vector may be determined as motion vector candidates for the current block, and a motion vector candidate list is generated by using the emotion vector candidates. The motion vector candidate of the current block can be derived by using the generated motion vector candidate list. The motion information of the current block may be determined based on the derived motion vector candidate. The motion vectors of the collocated blocks or the motion vectors of the blocks adjacent to the collocated blocks may be referred to as temporal motion vector candidates, and the motion vectors of the reconstructed neighboring blocks may be referred to as spatial motion vector candidates.

The encoding apparatus 100 may calculate a motion vector difference (MVD) between the motion vector of the current block and the motion vector candidate and may perform entropy encoding on the motion vector difference (MVD). In addition, the encoding apparatus 100 may perform entropy encoding on a motion vector candidate index and generate a bitstream. The motion vector candidate index may indicate an optimum motion vector candidate among the motion vector candidates included in the motion vector candidate list. The decoding apparatus may perform entropy decoding on the motion vector candidate index included in the bitstream and may select a motion vector candidate of a decoding target block from among the motion vector candidates included in the motion vector candidate list by using the entropy-decoded motion vector candidate index. In addition, the decoding apparatus 200 may add the entropy-decoded MVD and the motion vector candidate extracted through the entropy decoding, thereby deriving the motion vector of the decoding target block.

The bitstream may include a reference picture index indicating a reference picture. The reference picture index may be entropy-encoded by the encoding apparatus 100 and then signaled as a bitstream to the decoding apparatus 200. The decoding apparatus 200 may generate a prediction block of the decoding target block based on the derived motion vector and the reference picture index information.

Another example of the method of deriving the motion information of the current may be the merge mode. The merge mode may mean a method of merging motion of a plurality of blocks. The merge mode may mean a mode of deriving the motion information of the current block from the motion information of the neighboring blocks. When the merge mode is applied, the merge candidate list may be generated using the motion information of the reconstructed neighboring blocks and/or the motion information of the collocated blocks. The motion information may include at least one of a motion vector, a reference picture index, and an inter-picture prediction indicator. The prediction indicator may indicate one-direction prediction (L0 prediction or L1 prediction) or two-direction predictions (L0 prediction and L1 prediction).

The merge candidate list may be a list of motion information stored. The motion information included in the merge candidate list may be at least either one of the zero merge candidate and new motion information that is a combination of the motion information (spatial merge candidate) of one neighboring block adjacent to the current block, the motion information (temporal merge candidate) of the collocated block of the current block, which is included within the reference picture, and the motion information exiting in the merge candidate list.

The encoding apparatus 100 may generate a bitstream by performing entropy encoding on at least one of a merge flag and a merge index and may signal the bitstream to the decoding apparatus 200. The merge flag may be information indicating whether or not to perform the merge mode for each block, and the merge index may be information indicating that which neighboring block, among the neighboring blocks of the current block, is a merge target block. For example, the neighboring blocks of the current block may include a left neighboring block on the left side of the current block, an upper neighboring block disposed above the current block, and a temporal neighboring block temporally adjacent to the current block.

The skip mode may be a mode in which the motion information of the neighboring block is applied to the current block as it is. When the skip mode is applied, the encoding apparatus 100 may perform entropy encoding on information of the fact that the motion information of which block is to be used as the motion information of the current block to generate a bit stream, and may signal the bitstream to the decoding apparatus 200. The encoding apparatus 100 may not signal a syntax element regarding at least any one of the motion vector difference information, the encoding block flag, and the transform coefficient level to the decoding apparatus 200.

The current picture reference mode may mean a prediction mode in which a previously reconstructed region within a current picture to which the current block belongs is used for prediction. Here, a vector may be used to specify the previously-reconstructed region. Information indicating whether the current block is to be encoded in the current picture reference mode may be encoded by using the reference picture index of the current block. The flag or index indicating whether or not the current block is a block encoded in the current picture reference mode may be signaled, and may be deduced based on the reference picture index of the current block. In the case where the current block is encoded in the current picture reference mode, the current picture may be added to the reference picture list for the current block so as to be located at a fixed position or a random position in the reference picture list. The fixed position may be, for example, a position indicated by a reference picture index of 0, or the last position in the list. When the current picture is added to the reference picture list so as to be located at the random position, the reference picture index indicating the random position may be signaled.

Hereinafter, an image encoding/decoding method according to the present invention will be described in detail with reference to the above description.

Figure 5:
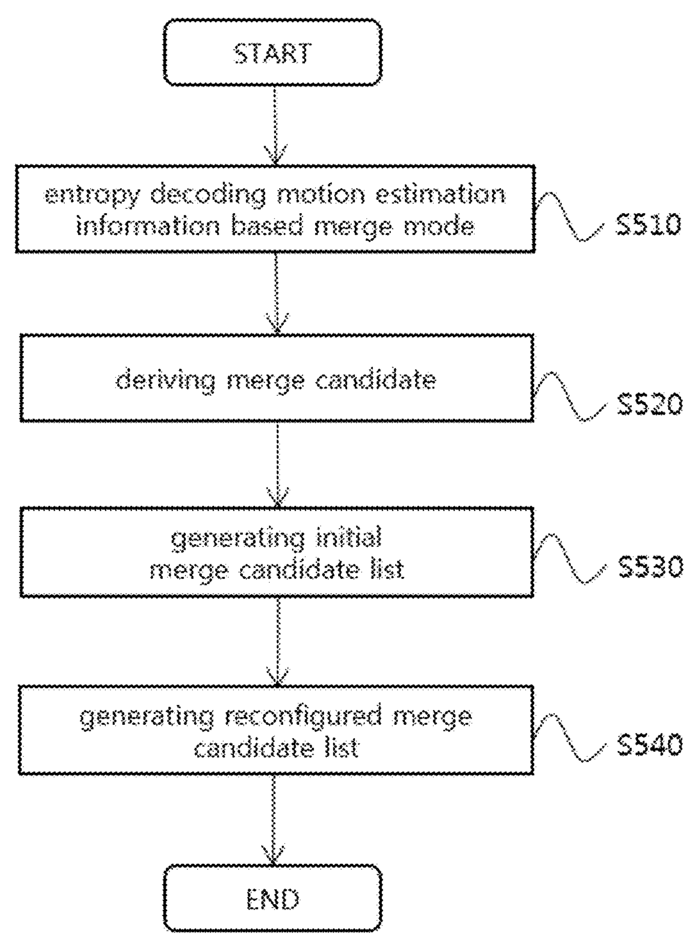
FIG. 5 is a view of a flowchart showing an image decoding method according to an embodiment of the present invention.

FIG. 5 is a view of a flowchart showing an image decoding method according to an embodiment of the present invention.

Referring to FIG. 5, in S510, a decoding apparatus may entropy decode information of motion estimation based on a merge mode, and in S520, derive a merge candidate of a current block on the basis of decoded information. Subsequently, in S530, the decoding apparatus may generate an initial merge candidate list of merge candidates by using a merge candidate previously derived. Subsequently, in S540, the decoding apparatus may generate a merge candidate list reconfigured by using the initial merge candidate list.

A merge candidate derived by the decoding apparatus may include at least one of a spatial merge candidate, a temporal merge candidate, a sub-block based temporal merge candidate, a sub-block based temporal-spatial combined merge candidate, and an additional merge candidate. However, types of merge candidates that may be merged by the decoding apparatus are not limited thereto, and various forms of merge candidates that may be implemented by those of ordinary skill in the art may be applied to the present invention.

Figure 6:
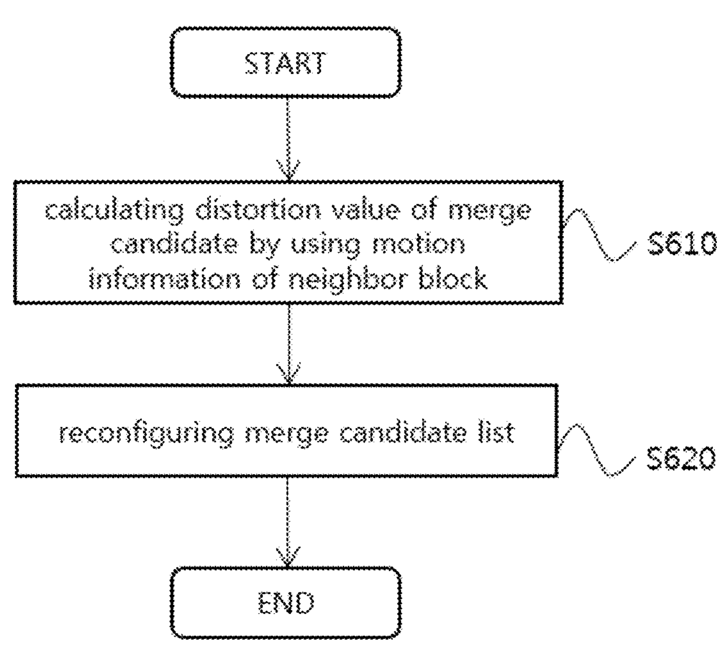
FIG. 6 is a view of a flowchart showing an image decoding method according to an embodiment of the present invention.

FIG. 6 is a view of a flowchart showing an image decoding method according to an embodiment of the present invention.

Referring to FIG. 6, S540 of generating, by the decoding apparatus, a reconstructed merge candidate list will be described in detail. In S610, the decoding apparatus may calculate a distortion value of a merge candidate that is derived by using motion information of a neighbor block of the current block. Subsequently, in S620, the decoding apparatus may generate a reconfigured merge candidate list by reconfiguring the initial merge candidate list on the basis of the calculated distortion value.

Figure 7:
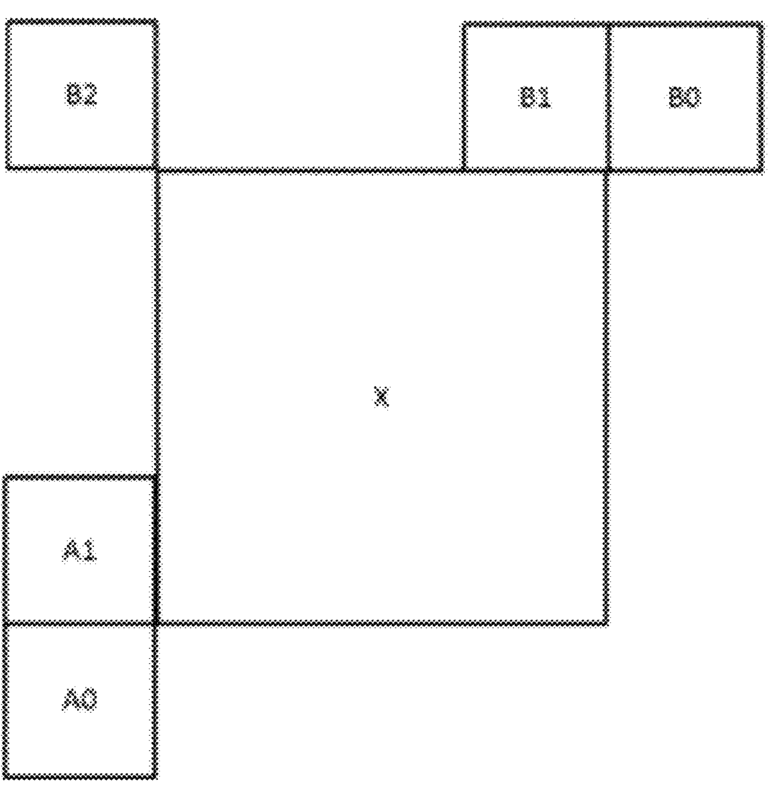
FIG. 7 is a view showing a method of deriving a spatial merge candidate.

FIG. 7 is a view showing a method of deriving a spatial merge candidate.

Referring to FIG. 7, a method of deriving, by the decoding apparatus, a spatial merge candidate of a current block to be decoded will be described in detail. The decoding apparatus may derive a spatial merge candidate of a current block from a reconstructed neighbor block that is spatially adjacent to the current block.

For example, motion information may be derived from blocks corresponding to a block A1 positioned to the left of a current block X, a block B1 positioned to the upper of the current block X, a block B0 positioned to the right upper corner of the current block X, a block A0 positioned to the left lower of the current block X, and a block B2 positioned to the left upper corner of the current block X, and the derived information may be used as a spatial merge candidate of the current block.

When deriving a spatial merge candidate of a current block from a reconstructed neighbor block, when motion information of the neighbor block is decoded through an affine transform model mode (affine mode) or current picture referencing (CPR) mode, the decoding apparatus does not use the corresponding neighbor block as a spatial merge candidate. Herein, a CPR mode may mean a prediction mode that may use a current image as a reference image when performing intra or inter-prediction.

In addition, a neighbor block may include corrected motion information rather than initial motion information. Herein, the decoding apparatus may use initial motion information of the neighbor block as a spatial merge candidate of a current block rather than using corrected motion information.

A spatial merge candidate may indicate motion information of a reconstructed neighbor block spatially adjacent to a current block, and may have a square form or non-square form. In addition, a reconstructed neighbor block spatially adjacent to a current block may be divided into a lower level block (sub-block) unit. The decoding apparatus may derive at least one spatial merge candidate for each lower level block.

In another example, a spatial merge candidate may include motion information of a reconstructed neighbor block that is not spatially adjacent to a current block. Herein, a reconstructed neighbor block that is not spatially adjacent to a current block may be a block positioned within the same CTU with the current block.

Meanwhile, when a reconstructed neighbor block that is not spatially adjacent to a current block is positioned in a CTU differing from the current block, a reconstructed neighbor block that is not spatially adjacent is not used as a spatial merge candidate of the current block. However, even though the neighbor block that is not spatially adjacent is positioned within the different CTU, the corresponding neighbor block may be used as a spatial merge candidate of the current block when the same is positioned to upper boundary or left boundary or both of a CTU to which the current block belongs.

Herein, deriving a spatial merge candidate may mean deriving a spatial merge candidate and adding the same to a merge candidate list. Herein, each merge candidate included in a merge candidate list may differ in motion information.

When adding, by the decoding apparatus, a spatial merge candidate to a merge candidate list, the decoding apparatus may determine whether or not motion information of all spatial merge candidates present in the merge candidate list, in addition to a candidate that is added previously before to a merge candidate list, is identical to motion information of a newly added spatial merge candidate. When the decoding apparatus determines that a spatial merge candidate identical to the newly added spatial merge candidate is not present in the merge candidate list, the decoding apparatus may add the spatial merge candidate to the merge candidate list.

The decoding apparatus may derive up to maxNumSpatialMergeCand spatial merge candidates. Herein, maxNumSpatialMergeCand may be a positive integer including 0.

In an example, maxNumSpatialMVPCand may be 5. MaxNumMergeCand may be a maximum number of merge candidates that may be included in a merge candidate list, and may be a positive integer including 0. In addition, numMergeCand may mean a number of merge candidates included in a practical merge candidate list within a preset MaxNumMergeCand. However, use of numMergeCand and MaxNumMergeCand does not limit the scope of the present invention. The decoding apparatus may use the above described information by using a parameter value having the same meaning with numMergeCand and MaxNumMergeCand.

FIG. 8 is a view showing a method of deriving a temporal merge candidate.

Referring to FIG. 8, a method of deriving, by the decoding apparatus, a temporal merge candidate of a current block to be decoded will be described in detail. The decoding apparatus may derive a temporal merge candidate from a reconstructed block in a reference image (reference picture) temporally adjacent to a current block. A reference image temporally adjacent to a current block may mean a co-located image (co-located picture). In addition, information of a co-located image may be transmitted from the encoding apparatus to the decoding apparatus in at least one unit of a sequence, a picture, a slice, a tile, a CTU, and a coding block unit within a CTU.

Alternatively, information of a co-located image may be implicitly derived by using at least one piece of motion information of already encoded/decoded blocks which are currently or temporally-spatially or both adjacent to a hierarchy according to an encoding/decoding order, and using an inter-prediction indicator of a co-located image of a sequence, a picture, a slice, and a tile level or reference image index information.

Information of a co-located image may include at least one of an inter-prediction indicator, a reference image index and motion vector information indicating a co-located block of a current block.

Herein, when deriving a temporal merge candidate of a current block, a position of a co-located image and a co-located block within the co-located image may be determined by using at least one piece of motion information of an already decoded block that is or is not temporally-spatially adjacent through a block identically positioned within the co-located image on the basis of a position of the current block.

Alternatively, by using at least one piece of motion vector information of an already decoded block that is or is not temporally-spatially adjacent to a current block from a position spatially identical to the current block within a selected co-located image, a block positioned by moving by the corresponding motion vector may be defined as a co-located block of the current block.

Herein, the motion information may include a motion vector, a reference image index, an inter-prediction indicator, a picture order count (POC), information of a co-located image of a current coding picture (or slice) level.

Herein, deriving a temporal merge candidate may mean deriving a temporal merge candidate and adding the same to a merge candidate list. In addition, adding a temporal merge candidate to a merge candidate list may mean adding a corresponding temporal merge candidate to a merge candidate list when motion information present in an existing merge candidate list and motion information of a newly derived temporal merge candidate are different.

When the decoding apparatus adds a temporal merge candidate, and a sub-block based temporal merge candidate that will be described later is present in an existing merge candidate list, the decoding apparatus may determine whether or not motion information of a sub-block based temporal merge candidate is identical to motion information of a newly added temporal merge candidate. When the decoding apparatus determines that a sub-block based temporal merge candidate having motion information identical to a newly added temporal merge candidate is not present in a merge candidate list, the decoding apparatus may add the corresponding temporal merge candidate to a merge candidate list.

In detail, the decoding apparatus may compare representative motion information of a sub-block based temporal merge candidate with motion information of a newly added temporal merge candidate. A detailed embodiment of obtaining representative motion information will be described below with reference to FIG. 11.

The decoding apparatus may determine whether or not an inter-prediction indicator of representative motion information is identical to a value of an inter-prediction indicator of a newly added temporal merge candidate. Herein, when a value of an inter-prediction indicator is not identical, the decoding apparatus may add a temporal merge candidate to a merge candidate list. Meanwhile, when a value of an inter-prediction indicator is identical, the decoding apparatus may not add a newly added temporal merge candidate to a merge candidate list.

In another example, when a value of an inter-prediction indicator is identical, the decoding apparatus may additionally determine whether or not a motion vector or reference image index of representative motion information is identical to a motion vector or reference image index of a newly added temporal merge candidate. When at least one of a motion vector and a reference image index is not identical, the decoding apparatus may add a temporal merge candidate to a merge candidate list.

In another example, even though a value of an inter-prediction indicator is identical, when at least one piece of motion information of L0 and L1 directions is not identical, the decoding apparatus may not add a temporal merge candidate to a merge candidate list.

On the other hand, when a temporal merge candidate is included first in an existing merge candidate list and a sub-block based temporal merge candidate is additionally added afterward, the decoding apparatus may determine whether or not to add a newly added sub-block based temporal merge candidate to a merge candidate list by using any one of methods described above. In other words, the decoding apparatus may compare motion information of a temporal merge candidate that is included in an existing merge candidate list with motion information of a newly added sub-block based temporal merge candidate, and determine whether or not to add the newly added sub-block based temporal merge candidate to the merge candidate list.

The decoding apparatus may derive up to maxNumTemporalMergeCand temporal merge candidates. Herein, maxNumTemporalMergeCand may be a positive integer including 0.

In an example, maxNumTemporalMergeCand may be 1. However, use of the maxNumTemporalMergeCand does not limit the scope of the present invention. The decoding apparatus may use the information described above by using a parameter value having the same meaning with maxNumTemporalMergeCand.

Hereinafter, prediction through a temporal merge candidate is referred to as temporal motion vector prediction (TMVP) in the present specification.

FIG. 8 is a view showing a method of deriving a temporal merge candidate. The decoding apparatus may derive a temporal merge candidate by using a block at a position H that is outside of a co-located block C positioned spatially identical to a current block X, or by using a block at a position C3.

When the decoding apparatus derives a temporal merge candidate from a block at a position H, a temporal merge candidate may be derived through a block at a position H, and when the decoding apparatus does not derive a temporal merge candidate from a block at a position H, a temporal merge candidate may be derived through a block at a position C3.

Herein, when the block at a position H or at a position C3 is encoded by using an intra-prediction method, the decoding apparatus cannot derive a temporal merge candidate. The co-located block may have a square form or non-square form.

In another example, when a block in association to the same (block at a position H or C3) is encoded by using affine transform model mode (affine mode) or current image reference mode (CPR mode), the decoding apparatus cannot derive a temporal merge candidate of a current block from the corresponding co-located block.

When a distance between an image including a current block and a reference image of the current block differs from a distance between an image including a co-located block and a reference image of the co-located block, the decoding apparatus may derive a temporal merge candidate by performing scaling for a motion vector of the co-located block. Scaling for a motion vector may be performed according to a ratio of td to tb (Ratio=(tb/td)).

Herein, td may mean a difference value between a POC of a co-located image and a POC of a reference image of the co-located block, and tb may mean a difference value between a POC of an image to be decoded and a POC of a reference image of a current block.

Hereinafter, a method of deriving, by the decoding apparatus, a sub-block based temporal merge candidate will be described.

The decoding apparatus may derive a temporal merge candidate from a co-located sub-block in a sub-block unit. The sub-block is a block having a horizontal or vertical size smaller than the current block or having a deeper depth or more reduced form than the current block, and may be a block included in the current block.

A co-located sub-block of a sub-block to be decoded may have a square form or non-square form. The decoding apparatus may divide a co-located block of a current block by a sub-block unit, and derive at least one temporal merge candidate for each sub-block.

When at least one temporal merge candidate is derived by dividing by a sub-block unit, a temporal merge candidate may be derived from a co-located sub-block corresponding to H or C3 according to a form or depth of a sub-block of the current block as described in FIG. 8. Alternatively, at least one temporal merge candidate may be derived from motion information stored in each sub-block unit of a co-located block in association with a position by moving according to motion information derived from neighbor blocks of the current block.

When deriving a temporal merge candidate of a current block or a sub-block of the current block, the decoding apparatus may perform scaling for a motion vector of each reference image list obtained from a co-located sub-block within a co-located block to a motion vector in association with an arbitrary reference image of the current block.

The decoding apparatus may obtain a plurality of motion vectors by performing scaling for a motion vector from a co-located sub-block to a motion vector in association with at least one reference image among all reference images that may be referenced by a sub-block of the current block, obtain at least one prediction block using a scaled motion vector in association with each reference image, and obtain a prediction block of the current block or sub-block by a weighted sum thereof.

Hereinafter, prediction through a sub-block based temporal merge candidate is referred to as alternative temporal motion vector prediction (ATMVP) in the present specification.

FIG. 9 is a view showing a method of deriving a sub-block based temporal-spatial combined merge candidate.

The decoding apparatus may derive a merge candidate of a current block by using at least one piece of motion information of a neighbor spatial sub-block or a co-located sub-block within a co-located image or both in a sub-block unit by dividing the current block into sub-blocks.

FIG. 9 is a view showing a method of deriving, by the decoding apparatus, a sub-block based temporal-spatial combined merge candidate. In FIG. 9, a current block having an 8×8 size with gray color is divided into four 4×4 sub-blocks.

The decoding apparatus may derive a sub-block based temporal-spatial combined merge candidate by using motion vector information of temporal-spatial sub-blocks of each sub-block.

In FIG. 9, when the decoding apparatus divides the current block into sub-blocks and derives a residual signal according to motion estimation, the decoding apparatus may obtain motion information by performing scanning from the left to the right based on a sub-block of that is upper of a sub-block A. For example, in FIG. 9, when an upper sub-block is encoded through an intra-prediction method, the decoding apparatus may sequentially scan an upper sub-block b.

The decoding apparatus may perform scanning for an upper neighbor block until an upper sub-block including usable motion vector information is found. The decoding apparatus may obtain motion information of a usable upper sub-block, and then obtain motion information by performing scanning from the top to the bottom based on a sub-block c that is left of the sub-block A.

The decoding apparatus may obtain spatial neighbor motion information of at least one of the left and upper sub-blocks, and in order to derive temporal motion information, the decoding apparatus may obtain motion information of at least one of a co-located sub-block and a co-located block of a current sub-block.

Herein, a position of a co-located block or a sub-block of the co-located block may be motion information of a block at a position C3 or H which is described in FIG. 8, or may indicate a sub-block of a co-located block at a position corrected by a motion vector derived adjacent to the current block or a co-located block at a corrected position.

By using the above method, the decoding apparatus may obtain at least one piece of motion information of at least one of L0 and L1 spatially neighbor blocks of the current block, and motion information of a temporal neighbor block, and derive a sub-block based temporal-spatial combined merge candidate of a sub-block that is currently decode on the basis of the same.

In one embodiment, the decoding apparatus may perform scaling for at least one motion vector derived in the temporal-spatial sub-block describing the sub-block of the current block with respect to at least one of L0 and L1 so as to correspond to the first reference image of the current block. Subsequently, the decoding apparatus may derive a motion vector of a current sub-block A or a temporal-spatial combined merge candidate of the sub-block A by using at least one of an average value, a maximum value, a minimum value, a median value, a weight value, a mode of up to three scaled motion vectors. By using the same method, the decoding apparatus may derive a temporal-spatial combined merge candidate of sub-blocks B, C, and D.

The decoding apparatus may not divide a current block into sub-blocks A, B, C, and D as shown in FIG. 9, and derive a merge candidate of the current block by using at least one piece of motion information of a neighbor spatial sub-block and a co-located sub-block within a co-located image. For example, the decoding apparatus may derive a temporal-spatial combined merge candidate of the current block by using motion information of the upper sub-block b, motion information of the left sub-block d, and motion information of a co-located block.

Hereinafter, prediction through a sub-block based temporal-spatial combined merge candidate is referred to as spatial-temporal motion vector prediction (STMVP) in the present specification.

Hereinafter, in addition to a spatial merge candidate, a temporal merge candidate, a sub-block based temporal merge candidate, and a sub-block based temporal-spatial combined merge candidate which are described above, an additional merge candidate that may be applied to the present invention will be described.

As an additional merge candidate that may be used in the present invention, the decoding apparatus may derive at least one of a modified spatial merge candidate, a modified temporal merge candidate, a combined merge candidate, and a merge candidate having a predetermined motion information value.

Herein, deriving an additional merge candidate may mean adding a corresponding merge candidate to a merge candidate list when a merge candidate including motion information differing from a merge candidate present in an existing merge candidate list is present.

Herein, the modified spatial merge candidate may mean a merge candidate obtained by modifying at least of motion information of a spatial merge candidate derived by using the method described above.

The modified temporal merge candidate may mean a merge candidate obtained by modifying at least one piece of motion information of a temporal merge candidate derived by using the method described above.

Herein, a merge candidate having a predetermined motion information value may mean a zero merge candidate having a motion vector of (0, 0). Hereinafter, prediction through a zero merge candidate is referred to as zero motion prediction (ZMP) in the present specification.

A combined merge candidate may mean a merge candidate using motion information of at least one of motion information of a spatial merge candidate, a temporal merge candidate, a modified spatial merge candidate, a modified temporal merge candidate, a combined merge candidate, and a merge candidate having a predetermined motion information value and which are present in a merge candidate list. Herein, a combined merge candidate may mean a combined bi-prediction merge candidate.

Herein, a combined merge candidate may be constituted for each list. For example, the decoding apparatus may generate a newly combined L0 list merge candidate by using an average value of candidates present in an L0 list. In addition, the decoding apparatus may generate a newly combined L1 merge candidate by using an average value of candidates present in an L1 list.

In addition, the decoding apparatus may generate an L0 or L1 list merge candidate by using candidates present in an L0 or L1 list.

For example, the decoding apparatus may generate a newly combined L0 list merge candidate by using an average value of candidates that are generated by performing mirroring or scaling for an L0 merge candidate and an L1 merge candidate in an L0 list direction.

In another example, the decoding apparatus may generate a newly combined L1 list merge candidate by using an average value of candidates that are generated by performing mirroring or scaling for an L1 merge candidate and an L0 merge candidate in an L1 list direction.

Hereinafter, prediction through a combined merge candidate will be referred to as combined motion prediction (CMP) in the present specification.

The decoding apparatus may derive at least one of a modified spatial merge candidate, a spatial merge candidate, a modified temporal merge candidate, a temporal merge candidate, a combined merge candidate, and a merge candidate having a predetermined motion information value for each sub-block, and add the merge candidate derived for each sub-block to a merge candidate list.

FIG. 10 is a view showing a method of determining a merge candidate list according to an embodiment of the present invention.

Hereinafter, a method of determining a merge candidate list according to an embodiment of the present invention will be described. As described in S530 of FIG. 5, the decoding apparatus may generate an initial merge candidate list of a current block. Subsequently, as described in S610 of FIG. 6, the decoding apparatus may calculate a distortion value of merge candidates of a current block by using motion information of each merge candidate included in the initial merge candidate list.

The motion information may include at least one of an inter-prediction indicator, an image index of L0 or L1 or both references, a motion vector of L0 or L1 or both, a POC and an LIC (local illumination compensation) flag of a current coding image or reference image or both, an affine flag, an OBMC (overlapped block motion compensation) flag, reconstructed luma or chroma or both samples spatially adjacent to a current block, and luma or chroma or both samples of a reference image indicated by motion information of a merge candidate. However, motion information of the present invention is not limited thereto.

An initial merge candidate list may be configured with motion information of up to N merge candidates, and N may mean a positive integer greater than 0. Herein, a spatial-temporal merge candidate may mean at least one of a spatial merge candidate, a temporal merge candidate, a sub-block based temporal merge candidate, a sub-block based spatial-temporal combined merge candidate, a combined merge candidate, and a zero merge candidate which are described above.

In order to configure up to N merge candidates within an initial merge candidate list, the decoding apparatus may fill the initial merge candidate list according to a preset order for a current block. Herein, the decoding apparatus may omit reconfiguring an additional merge candidate list, and determine the initial merge candidate list as a final merge candidate list of the current block.

When the decoding apparatus adds a new merge candidate to a merge candidate list, the decoding apparatus may add the new merge candidate to the merge candidate list when at least one piece of motion information of the newly added merge candidate differs from motion information of merge candidates that are included in an existing merge candidate list.

In an example, assuming that up to seven spatial-temporal merge candidates are allowed to a merge candidate list, up to seven initial merge candidate lists may be sequentially configured according to an arbitrary predetermined order as shown in Table 1 below. Herein, a merge index may have a value from 0 to 6. The example below showing an order of adding a merge candidate list is an example of the present invention, and the scope of the present invention is not limited thereto.

TABLE 1

| |
|---|
| A1 → B1 → B0 → A0 → ATMVP → STMVP → B2 → TMVP → CMP → ZMP |
| A1 → B1 → B0 → A0 → STMVP → ATMVP → B2 → TMVP → CMP → ZMP |
| A1 → B1 → B0 → ATMVP → STMVP → B2 → A0 → TMVP → CMP → ZMP |
| A1 → B1 → B0 → STMVP → ATMVP → B2 → A0 → TMVP → CMP → ZMP |
| A1 → B1 → ATMVP → STMVP → B0 → A0 → B2 → TMVP → CMP → ZMP |
| A1 → B1 → STMVP → ATMVP → B0 → A0 → B2 → TMVP → CMP → ZMP |

TABLE 1-continued

| |
|---|
| A1 → B1 → STMVP → ATMVP → B0 → B2 → A0 → TMVP → CMP → ZMP |
| A1 → B1 → STMVP → B0 → ATMVP → B2 → A0 → TMVP → CMP → ZMP |
| A1 → B1 → B0 → A0 → ATMVP → STMVP → CMP → B2 → TMVP → ZMP |
| A1 → B1 → B0 → A0 → ATMVP → STMVP → CMP → TMVP → B2 → ZMP |

Herein, A1, B1, A0, B0, and B2 may mean a spatial merge candidate described with FIG. 7.

For example, assuming that up to seven spatial-temporal merge candidates are allowed to a merge candidate list, the decoding apparatus may configure a merge candidate list with a number of merge candidates which corresponds to a decoded merge index so as to decrease a calculation amount or complexity. Accordingly, when a merge index is transmitted from 0 to 6, and a merge index practically decoded in the decoding apparatus is 3, the decoding apparatus may configure an initial merge candidate list by deriving up to four merge candidates.

In an example, in a module configuring a merge candidate list, initialization of a memory storing motion information of a merge candidate in a sub-block unit may be performed just before practically deriving a merge candidate in a sub-block unit. Herein, initialization may mean designating an initial value of a motion vector of a sub-block unit, an inter-prediction indicator, and L0 or L1 or both reference image indexes in a sub-block unit.

When the decoding apparatus configures an initial merge candidate list, and a number of spatial merge candidates included in the initial merge candidate list is smaller than a preset value K, the decoding apparatus may omit calculating a distortion value of merge candidates, and determine the initial merge candidate list as a final merge candidate list of a current block. Herein, K may mean an arbitrary positive integer greater than 0.

Hereinafter, a method of calculating, by the decoding apparatus, a distortion value will be described in detail.

The decoding apparatus may configure an initial merge candidate list, and then may calculate a distortion value between a current block and an arbitrary merge candidate by using reconstructed luma or chroma or both samples spatially adjacent to the current block (reconstructed sample adjacent to the current block), and luma or chroma or both samples spatially adjacent to a reference block of a reference image indicated by motion information of each merge candidate (samples adjacent to the reference block).

The decoding apparatus may calculate a distortion value by using at least one of SAD (sum of absolute differences), SATD (sum of absolute transformed differences), and MR-SAD (mean removed sum of absolute difference) between reconstructed samples adjacent to the current block and samples adjacent to the reference block.

As shown in FIG. 10, at least one block having an arbitrary size, form, and depth and which is configured with at least one sample adjacent to a current block may be defined as templates 1000 and 1005.

In addition, by using at least one piece of motion information adjacent to the upper of a current block or at least one piece of motion information adjacent to the left of the current block or both, the decoding apparatus may define as templates 1010 and 1015 of a reference block at least one block having an arbitrary size, form, and depth and which is configured with samples which are temporally motion estimated from a reference image.

The decoding apparatus may calculate a distortion value between the templates 1000 and 1005 of the current block and the templates 1010 and 1015 of the reference block indicated by a merge candidate. The decoding apparatus may define as a template for calculating a distortion value of an upper template 1000 (above template) or a left template 1005.

A width and a height described in FIG. 10 mean horizontal and vertical sizes of a current block. Herein, M and K may be a positive integer greater than 0. M and K may have the same value or values different from each other. In addition, a width or a height or both may be set to have the same value with a width or a height or both of a current block or to have different values.

FIG. 10 is a view showing an embodiment where an upper template has a value of width*M, and a left template has a value of height*K.

In an example, a distortion value between a current block and a reference block within a reference image indicated by motion information of an arbitrary merge candidate may be calculated by using at least one of SAD, SATD, and MRSAD between the template 1000 (Template (Current)) of the current block, and a reference block template 1010 (Template L0) or a reference block template 1015 (Template L1) or both.

The decoding apparatus may use one of a Template L0 and a Template L1 as a template for calculating a distortion value, or may use both of the Template L0 and the Template L1. When both of the Template L0 and the Template L1 are used, the decoding apparatus may calculate a distortion value by a weighted average of the Template L0 and the Template L1.

A distortion value between current block templates 1000 and 1005 and the Template L0 1010 may be defined as a Distortion (L0), a distortion value between the current block template and the Template L1 may be defined as a Distortion (L1), and a distortion value between weighted averages of the current block template, the Template L0, and the Template L1 may be defined as a Distortion (Bi). Herein, the Distortion (L0) and the Distortion (L1) may be defined as a first distortion value and a second distortion value. The Template L0 and the Template L1 may be respectively defined as a first template and a second template.

When an arbitrary merge candidate includes only L0 direction motion information, the decoding apparatus may calculate a Distortion (L0), or may calculate a Distortion (L1) and a Distortion (Bi) by deriving L1 direction motion information by performing mirroring for the L0 direction motion information. Herein, mirroring may be performing symmetry for a value of a motion vector with respect to the origin.

For example, when X and Y movement amounts of an L0 direction motion vector are (3, 5), an L1 vector value obtained by performing mirroring for the motion vector may be derived as (−3, −5).

In another example, the decoding apparatus may calculate a final distortion value of a current block by using at least one of a minimum value, a median value, and an average value after calculating all of a Distortion (L0), a Distortion (L1), and a Distortion (Bi).

In another example, when the decoding apparatus defines a distortion value between a current block and a merge candidate as a minimum value of a Distortion (L0), a Distortion (L1), and a Distortion (Bi), the decoding apparatus may decode a current block by updating motion information of a merge candidate list in that a current merge candidate includes only L0 motion information when a distortion value has a minimum value in a Distortion (L0) even though a merge candidate of an initial merge candidate list includes bi-direction motion information.

When reconfiguring an initial merge candidate list, the decoding apparatus may reconfigure an initial merge candidate list on the basis of information transmitted from the encoding apparatus without calculating a distortion value described above. Information transmitted from the encoding apparatus may be indicator information indicating a list reconfiguring method preset in the encoding apparatus and the decoding apparatus or may be an index indicating a preset list.

Figure 11:
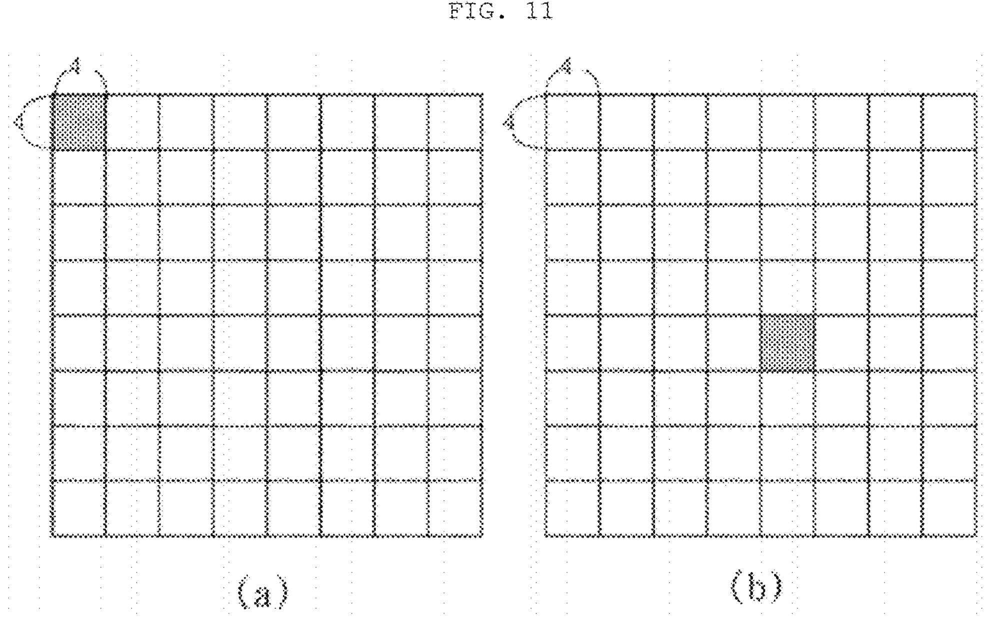
FIG. 11 is a view showing a method of determining representative motion information according to an embodiment of the present invention.

FIG. 11 is a view showing a method of determining representative motion information according to an embodiment of the present invention.

Referring to FIG. 11, a case where an arbitrary merge candidate includes at least one piece of motion information will be described. When an arbitrary merge candidate constituting an initial merge candidate list is ATMVP or STMVP or both including at least one piece of motion information, the decoding apparatus may calculate a distortion value of a current block by using representative motion information through the same method described above.

Representative motion information of the arbitrary merge candidate may be determined by motion information at a preset position from motion information of sub-blocks having at least one piece of motion information different from each other, or may be derived by a weighted average between motion information of all sub-blocks.

In an example, when a size of a current block is a 32×32 block greater than 4×4, and a merge candidate is ATMVP or STMVP or both of a 4×4 sub-block unit, in order to derive a template of a reference block for a current block, the decoding apparatus may derive motion information of the first sub-block of the current block as a hatched area shown in FIG. 11(*a*) as representative motion information of a merge candidate.

In another example, when a size of a current block is a 32×32 block greater than 4×4 and a merge candidate is ATMVP or STMVP or both of a 4×4 sub-block unit, in order to derive a template of a reference block for a current block, the decoding apparatus may derive motion information of a sub-block positioned in the center of the current block as a hatched area shown in FIG. 11(*b*) as representative motion information of a merge candidate.

In another example, when a size of a current block is a 32×32 block greater than 4×4 and a merge candidate is ATMVP or STMVP or both of a 4×4 sub-block unit, in order to derive a template of a reference block, the decoding apparatus may derive representative motion information by using at least one of a mode, a median value, and an average value of sub-blocks different from each other.

When the decoding apparatus calculates a distortion value, the decoding apparatus may precisely calculate a distortion value by correcting (refinement) a template of a reference block. As shown in FIG. 10, the decoding apparatus may calculate a Distortion (L0) by using an L0 direction reference block template, but may change a motion vector by applying an arbitrary offset to an L0 direction motion vector derived in a merge candidate and then derive a template of a reference block.

In one example, when an offset is 1, and a size of X and Y directions indicated by an L0 motion vector of an arbitrary merge candidate is (3, 4), the decoding apparatus may derive at least one template of a reference block indicated by each motion vector in a cross form such as (2, 4), (4, 4), (3, 3), and (3, 5) by applying an offset of +1 and −1, to an X-axis direction and applying an offset of +1 and −1 to a Y-axis direction in addition to a template of the reference block corresponding to (3, 4). Herein, the decoding apparatus may define a minimum value among values of calculated distortion values by using a plurality of templates as a Distortion (L0). Herein, when a Distortion (L0) is determined at (3, 5), an L0 direction motion vector of an arbitrary merge candidate may be updated from (3, 4) to (3, 5), and set in a merge candidate list.

Figure 12:
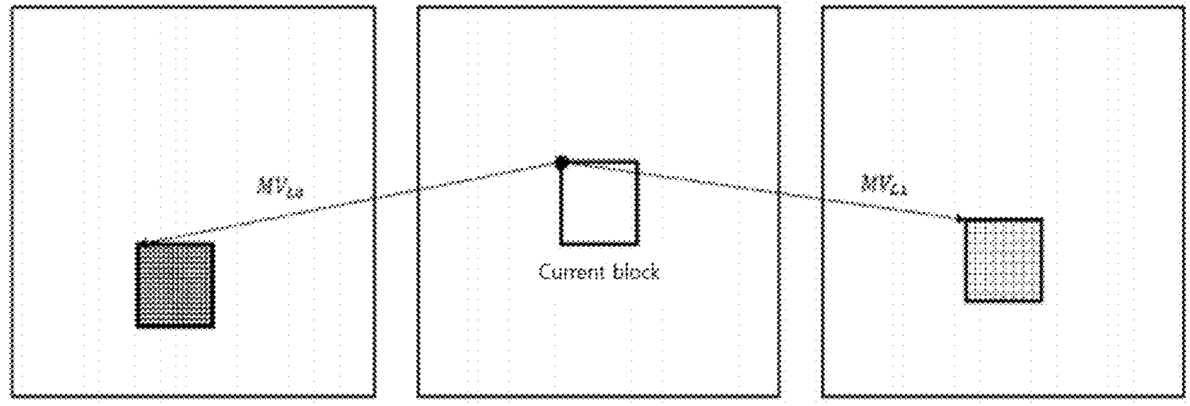
FIG. 12 is a view showing a method of calculating a distortion value according to an embodiment of the present invention.

FIG. 12 is a view showing a method of calculating a distortion value according to an embodiment of the present invention.

As shown in FIG. 12, when an arbitrary merge candidate of a current block includes bi-direction motion information, the decoding apparatus may define a distortion value between a L0 reference block and a L1 reference block as a distortion value between the current block and the arbitrary merge candidate.

Figure 13:
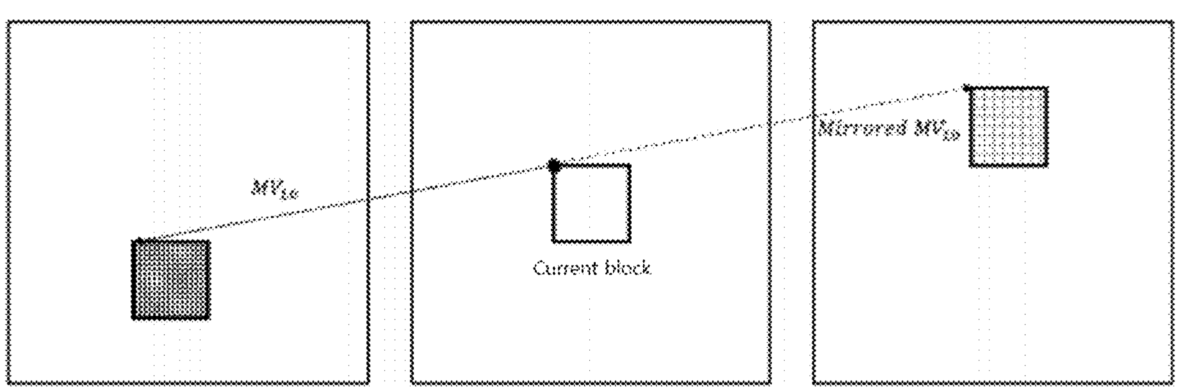
FIG. 13 is a view showing a method of calculating a distortion value according to another embodiment of the present invention.

FIG. 13 is a view showing a method of calculating a distortion value according to another embodiment of the present invention.

As shown in FIG. 13, when an arbitrary merge candidate includes uni-direction (L0 or L1) motion information, the decoding apparatus may define a distortion value between a L0 reference block and an L1 reference block obtained by performing mirroring for a motion vector of the uni-direction motion information as a distortion value between the current block and the arbitrary merge candidate.

Figure 14:
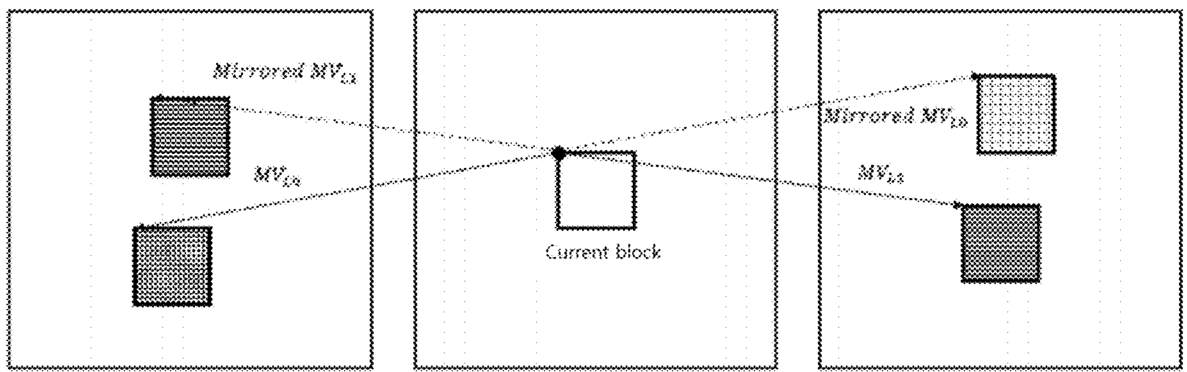
FIG. 14 is a view showing a method of calculating a distortion value according to another embodiment of the present invention.

FIG. 14 is a view showing a method of calculating a distortion value according to another embodiment of the present invention.

As shown in FIG. 14, when an arbitrary merge candidate includes bi-direction motion information, the decoding apparatus may calculate a Distortion (L0) between an L0 reference block and an L1 reference block after calculating a reference block in an L1 direction by performing mirroring for a motion vector of L0. By using the same method, the decoding apparatus may calculate a Distortion (L1) between an L0 reference block and an L1 reference block after calculating a reference block in an L0 direction by performing mirroring for a motion vector of L1. The decoding apparatus may calculate a distortion value between the current block and the arbitrary merge candidate by using at least one of an average value, a minimum value, and a maximum value of the Distortion (L0) and the Distortion (L1). For example, when the Distortion (L0) has a minimum value, the decoding apparatus may determine that a current merge candidate includes only L0 motion information, and perform decoding by updating motion information of the merge candidate list.

Figure 15:
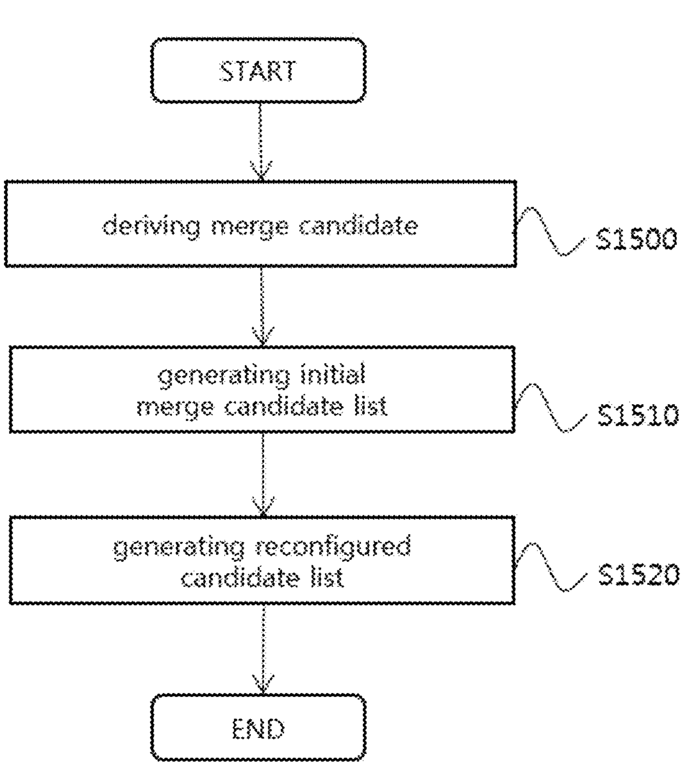
FIG. 15 is a view of a flowchart showing an image encoding method according to an embodiment of the present invention.

As described with FIGS. 13 to 15, when calculating a distortion value between reference blocks, the decoding apparatus may use a motion vector derived in a merge candidate as it is or may change a motion vector by applying an arbitrary offset to a motion vector that is initially derived. The decoding apparatus may define as a final distortion value between a current block and an arbitrary merge candidate a minimum value among distortion values calculated by applying the offset.

Hereinafter, a method of reconfiguring, by the decoding apparatus, a merge candidate list will be described in detail.

As described in S620 of FIG. 6, the decoding apparatus may reconfigure an initial merge candidate list by using a distortion value calculated by using motion information of a neighbor block.

The decoding apparatus may calculate a distortion value of all merge candidates of the initial merge candidate list, and then fill the merge candidate list from a merge candidate having a small distortion value.

In an example, the decoding apparatus may calculate a distortion value for L arbitrary merge candidates of the initial merge candidate list, and then fill the merge candidate list from a merge candidate having a small distortion value. When a maximum number of merge candidates included in a merge candidate list is P, L may be smaller than P.

Merge candidates for calculating a distortion value may have a merge index from 0 to L−1 in an initial merge candidate list. For example, when L is 2, a merge candidate list may be reconfigured by calculating a distortion value for two merge candidates filled in the initial merge candidate list.

For example, when an initial merge candidate list is determined to be configured in an order of (A1-B1-B0-A0-ATMVP-STMVP-B2), and L is 2 and a distortion value of a spatial merge candidate B1 is smaller than a distortion value of a spatial merge candidate A1, the decoding apparatus may reconfigure the initial merge candidate list in an order of (B1-A1-B0-A0-ATMVP-STMVP-B2).

In another example, the decoding apparatus may reconfigure a merge candidate having the smallest calculated distortion value as the first merge candidate when reconfiguring the merge candidate list. When an order of configuring an initial merge candidate list is determined as (A1-B1-B0-A0-ATMVP-STMVP-B2), and a distortion value of a spatial merge candidate B0 is smaller than a distortion value of a spatial merge candidate A1 in the initial merge candidate list, the decoding apparatus may reconfigure the initial merge candidate list as (B0-A1-B1-A0-ATMVP-STMVP-B2).

In another embodiment, the decoding apparatus may use an order of a merge candidate list that is reconfigured in a neighbor block or in an upper level of the current block for reconfiguring a merge candidate list of the current block. The decoding apparatus may be provided from the encoding apparatus whether or not to use an order of a merge candidate list that is reconfigured in a neighbor block or in an upper level, or may determine on the basis of a coding parameter.

The encoding apparatus may determine whether or not to reconfigure a merge candidate list of a current block, and entropy encode information indicating whether or not to perform reconfiguration. Whether or not to perform, by the encode apparatus, reconfiguring of a merge candidate list may be determined by comparing an RD cost before applying a merge candidate list reconfiguring method and an RD cost after performing a merge candidate list reconfiguring method.

The decoding apparatus may entropy decode information indicating whether or not to perform reconfiguring of a merge candidate list from a bitstream, and reconfigure a merge candidate list according to the received information.

The encoding apparatus or the decoding apparatus may be set to entropy encoding/decoding or omitting the same information indicating whether or not to perform reconfiguring of a merge candidate list according to a coding parameter of a current block.

For example, the encoding apparatus or the decoding apparatus may be set to perform or not to perform reconfiguring of a merge candidate list when a size of a current block is equal to or smaller than a predefined size, form, and depth. On the other hand, the encoding apparatus or the decoding apparatus current block may be set to perform or not to perform reconfiguring of a merge candidate list when a size of a current block is equal to or greater than a predefined size, form, and depth.

In another example, the encoding apparatus and the decoding apparatus may be set not to perform reconfiguring of a merge candidate list when a size of a current block is equal to or greater than or equal to or smaller than a predefined size, and is divided by binary tree or quad three.

In another example, the encoding apparatus or the decoding apparatus may be set not to perform reconfiguring of a merge candidate list when a size of a current block is equal to or greater than or equal to or smaller than a predefined size, and is divided by binary tree or quad three.

The decoding apparatus may determine whether or not to apply a merge candidate list reconfiguring method to a current target block according to flag information entropy decoded in at least one of a picture/slice unit, a CTU unit, and a CTU lower level unit. Herein, a lower level unit may include at least one of a CTU lower level unit, a quad tree unit, and a binary three unit. In another example, the decoding apparatus may determine whether or not to perform a merge candidate list reconfiguring method according to a temporal layer of a current picture or slice to which a current block belongs.

FIG. 15 is a view of a flowchart showing an image encoding method according to an embodiment of the present invention.

Referring to FIG. 15, in S1500, the encoding apparatus may derive a merge candidate of a current block. Subsequently, in S1510, the encoding apparatus may generate an initial merge candidate list of merge candidates by using the derived merge candidate list. Subsequently, in S1520, the encoding apparatus may generate a reconfigured merge candidate list by using the initial merge candidate list.

Calculating, by the encoding apparatus, a distortion value of a merge candidate by using motion information of a neighbor block, and reconfiguring a merge candidate list on the basis of the same correspond to operation of the decoding apparatus described with FIG. 6, and thus description thereof will be omitted.

The above embodiments may be performed in the same method in an encoder and a decoder.

A sequence of applying to above embodiment may be different between an encoder and a decoder, or the sequence applying to above embodiment may be the same in the encoder and the decoder.

The above embodiment may be performed on each luma signal and chroma signal, or the above embodiment may be identically performed on luma and chroma signals.

A block form to which the above embodiments of the present invention are applied may have a square form or a non-square form.

The above embodiment of the present invention may be applied depending on a size of at least one of a coding block, a prediction block, a transform block, a block, a current block, a coding unit, a prediction unit, a transform unit, a unit, and a current unit. Herein, the size may be defined as a minimum size or maximum size or both so that the above embodiments are applied, or may be defined as a fixed size to which the above embodiment is applied. In addition, in the above embodiments, a first embodiment may be applied to a first size, and a second embodiment may be applied to a second size. In other words, the above embodiments may be applied in combination depending on a size. In addition, the above embodiments may be applied when a size is equal to or greater that a minimum size and equal to or smaller than a maximum size. In other words, the above embodiments may be applied when a block size is included within a certain range.

For example, the above embodiments may be applied when a size of current block is 8×8 or greater. For example, the above embodiments may be applied when a size of current block is 4×4 or greater. For example, the above embodiments may be applied when a size of current block is 16×16 or greater. For example, the above embodiments may be applied when a size of current block is equal to or greater than 16×16 and equal to or smaller than 64×64.

The above embodiments of the present invention may be applied depending on a temporal layer. In order to identify a temporal layer to which the above embodiments may be applied, a corresponding identifier may be signaled, and the above embodiments may be applied to a specified temporal layer identified by the corresponding identifier. Herein, the identifier may be defined as the lowest layer or the highest layer or both to which the above embodiment may be applied, or may be defined to indicate a specific layer to which the embodiment is applied. In addition, a fixed temporal layer to which the embodiment is applied may be defined.

For example, the above embodiments may be applied when a temporal layer of a current image is the lowest layer. For example, the above embodiments may be applied when a temporal layer identifier of a current image is 1. For example, the above embodiments may be applied when a temporal layer of a current image is the highest layer.

A slice type to which the above embodiments of the present invention are applied may be defined, and the above embodiments may be applied depending on the corresponding slice type.

When a motion vector having at least one of a 16-pel unit, an 8-pel unit, a 4-pel unit, an integer-pel unit, 1/8-pel unit, 1/16-pel unit, 1/32-pel unit and 1/64-pel unit, the above embodiments of the present invention can also be applied. The motion vector may be selectively used for each pixel unit.

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

The embodiments include various aspects of examples. All possible combinations for various aspects may not be described, but those skilled in the art will be able to recognize different combinations. Accordingly, the present invention may include all replacements, modifications, and changes within the scope of the claims.

The embodiments of the present invention may be implemented in a form of program instructions, which are executable by various computer components, and recorded in a computer-readable recording medium. The computer-readable recording medium may include stand-alone or a combination of program instructions, data files, data structures, etc. The program instructions recorded in the computer-readable recording medium may be specially designed and constructed for the present invention, or well-known to a person of ordinary skilled in computer software technology field. Examples of the computer-readable recording medium include magnetic recording media such as hard disks, floppy disks, and magnetic tapes; optical data storage media such as CD-ROMs or DVD-ROMs; magneto-optimum media such as floptical disks; and hardware devices, such as read-only memory (ROM), random-access memory (RAM), flash memory, etc., which are particularly structured to store and implement the program instruction. Examples of the program instructions include not only a mechanical language code formatted by a compiler but also a high level language code that may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

The present invention may be used in encoding/decoding an image.

What is claimed is:

1. A method of decoding an image, the method comprising:

deriving a sub-block based temporal merge candidate of a current block based on a collocated block in a collocated picture;

generating a sub-block based merge candidate list based on the sub-block based temporal merge candidate of the current block;

deriving a motion vector for each of a plurality of sub-blocks of the current block based on the sub-block based merge candidate list; and deriving prediction samples of the plurality of sub-blocks of the current block based on the motion vector for each of a plurality of sub-blocks, wherein a location of the collocated block is a location in the collocated picture moved based on a motion vector of a spatial neighboring block of the current block from a location in the collocated picture that corresponds to the location of the current block, and wherein the spatial neighboring block of the current block is a left neighboring block of the current block.

2. A method of encoding an image, the method comprising:

deriving a sub-block based temporal merge candidate of a current block based on a collocated block in a collocated picture;

generating a sub-block based merge candidate list based on the sub-block based temporal merge candidate of the current block;

deriving a motion vector for each of a plurality of sub-blocks of the current block based on the sub-block based merge candidate list;

deriving prediction samples of the plurality of sub-blocks of the current block based on the motion vector for each of a plurality of sub-blocks; and encoding image information including prediction related information of the current block, wherein a location of the collocated block is a location in the collocated picture moved based on a motion vector of a spatial neighboring block of the current block from a location of the current block, and wherein the spatial neighboring block of the current block is a left neighboring block of the current block.

3. A transmission method for image data, the method comprising:

obtaining a bitstream of encoded image information, wherein the encoded image information is generated based on deriving a sub-block based temporal merge candidate of a current block based on a collocated block in a collocated picture, generating a sub-block based merge candidate list based on the sub-block based temporal merge candidate of the current block, deriving a motion vector for each of a plurality of sub-blocks of the current block based on the sub-block based merge candidate list, deriving prediction samples of the plurality of sub-blocks of the current block based on the motion vector for each of a plurality of sub-blocks, and encoding image information including prediction related information of the current block; and transmitting the image data comprising the bitstream, wherein a location of the collocated block is a location in the collocated picture moved based on a motion vector of a spatial neighboring block of the current block from a location of the current block, and wherein the spatial neighboring block of the current block is a left neighboring block of the current block.

* * * * *